(12) United States Patent
Maehara et al.

(10) Patent No.: US 6,556,201 B1
(45) Date of Patent: Apr. 29, 2003

(54) IMAGE GENERATION SYSTEM, IMAGE DISPLAY SYSTEM, COMPUTER-READABLE RECORD MEDIUM RECORDING IMAGE GENERATION PROGRAM, AND IMAGE GENERATION METHOD

(75) Inventors: Hideaki Maehara, Tokyo (JP); Satoshi Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 175 days.

(21) Appl. No.: 09/637,699

(22) Filed: Aug. 15, 2000

(30) Foreign Application Priority Data

Aug. 16, 1999 (JP) .......................................... 11-229646
Mar. 7, 2000 (JP) ...................................... 2000-061958

(51) Int. Cl.$^7$ ............................................. G06T 15/10
(52) U.S. Cl. ..................................................... 345/427
(58) Field of Search ................................ 345/427, 419, 345/473, 474, 418

(56) References Cited

U.S. PATENT DOCUMENTS 6,017,272 A * 1/2000 Rieder .......................... 463/31
6,404,436 B1 * 6/2002 Goden ......................... 345/473
6,411,294 B1 * 6/2002 Furuhashi et al. .......... 345/421

FOREIGN PATENT DOCUMENTS

JP     A10222696     8/1998
JP     A10222692     9/1998

\* cited by examiner

*Primary Examiner*—Cliff N. Vo
(74) *Attorney, Agent, or Firm*—Birch, Stewart, Kolasch & Birch, LLP

(57) ABSTRACT

An image generation system which comprises an image generation apparatus having viewpoint definition means for defining a virtual viewpoint placed in virtual three dimensions, virtual panel definition means for defining a virtual object displayed in the virtual three dimensions and defining a virtual panel being placed in the virtual three dimensions, the virtual panel onto which a moving image is projected, based on the virtual viewpoint and the virtual object, moving image selection means for selecting a moving image to be projected onto the virtual panel from among a plurality of moving images based on the virtual viewpoint defined in the viewpoint definition means, and virtual three-dimensional image generation means for placing the virtual panel defined in the virtual panel definition means in the virtual three dimensions, projecting the moving image selected by the moving image selection means onto the virtual panel, and generating an image from the virtual viewpoint defined in the viewpoint definition means, and a moving image output apparatus for outputting the plurality of moving images to the image generation apparatus.

12 Claims, 13 Drawing Sheets

IMAGE GENERATION SYSTEM, IMAGE DISPLAY SYSTEM, COMPUTER-READABLE RECORD MEDIUM RECORDING IMAGE GENERATION PROGRAM, AND IMAGE GENERATION METHOD

BACKGROUND OF THE INVENTION

1. Field of the Invention

This invention relates to an image generation system for generating a virtual three-dimensional image based on computer graphics, an image display system for displaying the image generated in the image generation system, a computer-readable record medium recording an image generation program for generating the image, and an image generation method for generating the image.

2. Description of the Related Art

In computer graphics, particularly, in real-time computer graphics (or real-time CG) for enabling the operator to move the viewpoint freely and smoothly as he or she intends, a method of really representing an object such as a human being having curved surface portions and motion is demanded. A virtual object in the real-time CG is displayed by combining plane polygons called polygons three-dimensionally and giving color to or putting a photo on the polygons. Motion can be given to the virtual object by changing the geometric shape and position of each polygon.

Generally, an artificial object such as a machine can be really displayed with several ten to several thousand polygons. However, for objects having a large number of curved surface portions such as human beings and animals and plants, polygons must approximate each curved face portion, thus a number of polygons exceeding several hundreds of thousands of polygons become necessary for producing real display. However, the greater the number of polygons, the larger the computation load on a computer. Thus, to operate the real-time CG using a general-purpose computer widespread up to now, the number of polygons must be reduced to about several thousands. Thus, human beings, animals, plants, etc., cannot really be displayed on a general-purpose computer; this is a problem. Several arts intended for resolving the problem have been disclosed so far.

For example, JP-A-10-222629 describes a method of displaying a motion human figure, etc., in virtual three dimensions created by real-time CG. According to the method, to display a human figure, the human figure is not formed of polygons and animation data created from an actual video or computer graphics is used. The method is as follows: First, animation data for viewing an object from six directions of up and down, back and forth, and left and right is provided. Next, a rectangular parallelepiped made up of six rectangular polygons is placed at a position where the object should exist in the virtual three dimensions. Next, a polygon having a normal vector nearest to the direction of the line extended to the object from a virtual viewpoint in the virtual three dimensions is selected out of the six polygons. Subsequently, only the selected polygon is placed in a visible state and the provided animation data is projected. At this time, if the selected plane (polygon) is front, animation data for viewing the object from the forth direction is selected and projected. According to the method, the real animation data of the object is projected on any polygon and real-time CG of the object is generated, whereby the object can be really displayed without increasing the number of polygons. A motion object can also be displayed.

For example, JP-A-10-222696 describes a method of displaying the internal structure of a complicated human body, etc., in real-time CG. According to the method, to display the internal structure of a human body, etc., the internal structure of the human body is not formed of polygons and an image created from a photo or computer graphics is used. The method is as follows: First, a collection of image data for viewing an object from a plurality of directions such as up and down, back and forth, and left and right with the object as the center is provided. Next, one rectangular polygon is placed at a position where the object should exist in virtual three dimensions so as to always face the front relative to the virtual viewpoint in the virtual three dimensions. Next, image data for viewing the object from the nearest direction to the object viewing direction from the virtual viewpoint is selected out of the provided image data. Subsequently, the selected image data is projected on the above-mentioned polygon Using the method, the real animation data of the object is projected on the polygon and real-time CG of the object is generated, whereby the object can be really displayed without increasing the number of polygons.

In the related arts, however, the provided animation data and image data need to be stored in storage means. Thus, if the information amount of the animation data or the image data is enormous, it is impossible to generate an image in the real-time CG on a general-purpose computer with a small storage capacity widespread up to now; this is a problem. For example, to display a virtual object more smoothly, more freely, and more really in response to a viewpoint move intended by the operator, the information amount of the animation data or the image data needs to be increased in response to the degree. Since the current general-purpose computer with a small storage capacity cannot store an enormous amount of information, an image cannot be generated.

Since the data to be projected on the polygon is selected out of the provided animation data or image data, an image can be generated only in the range of the storage contents; this is a problem.

An image when the virtual viewpoint for the object placed at a predetermined position in the virtual three dimensions is changed by the operator's will is generated and displayed, and an image when the position or orientation of the virtual object itself is changed by the operator's will cannot be generated; this is a problem.

SUMMARY OF THE INVENTION

It is therefore an object of the invention to generate an image capable of really displaying the object of a human being, an animal, a plant, etc., having curved surface portions and motion and display the image even with a general-purpose computer having a small storage capacity.

It is another object of the invention to generate an image capable of really displaying the object of a human being, etc., having curved surface portions and motion and display the image without previously creating animation data or image data and without storing the data in a general-purpose computer.

It is another object of the invention to generate an image when the position or the orientation of a virtual object is changed by the operator's will and display the image.

According to one aspect of the invention, there is provided an image generation system for generating a virtual three-dimensional image based on computer graphics, the image generation system comprising an image generation apparatus having viewpoint definition means for defining a virtual viewpoint placed in virtual three dimensions, virtual panel definition means for defining a virtual object displayed in the virtual three dimensions and defining a virtual panel being placed in the virtual three dimensions, the virtual panel onto which a moving image is projected, based on the virtual viewpoint and the virtual object, moving image selection means for selecting a moving image to be projected onto the virtual panel from among a plurality of moving images based on the virtual viewpoint defined in the viewpoint definition means, and virtual three-dimensional image generation means for placing the virtual panel defined in the virtual panel definition means in the virtual three dimensions, projecting the moving image selected by the moving image selection means onto the virtual panel, and generating an image from the virtual viewpoint defined in the viewpoint definition means, and a moving image output apparatus for outputting the plurality of moving images to the image generation apparatus.

In the image generation system according to the invention, the moving image selection means selects the moving image to be projected onto the virtual panel from among a plurality of moving images based on the virtual viewpoint defined in the viewpoint definition means and the virtual object defined in the virtual panel definition means.

According to another aspect of the invention, there is provided an image generation system for generating a virtual three-dimensional image based on computer graphics, the image generation system comprising an image generation apparatus having viewpoint definition means for defining a virtual viewpoint placed in virtual three dimensions, virtual panel definition means for defining a virtual object displayed in the virtual three dimensions and defining a virtual panel being placed in the virtual three dimensions, the virtual panel onto which a moving image is projected, based on the virtual viewpoint and the virtual object, and virtual three-dimensional image generation means for placing the virtual panel defined in the virtual panel definition means in the virtual three dimensions, projecting a moving image onto the virtual panel, and generating a virtual three-dimensional image based on computer graphics from the virtual viewpoint defined in the viewpoint definition means, and a moving image output apparatus for outputting the moving image to be projected onto the virtual panel based on the virtual viewpoint defined in the viewpoint definition means.

In the image generation system according to the invention, the moving image output apparatus outputs the moving image to be projected onto the virtual panel based on the virtual viewpoint defined in the viewpoint definition means and the virtual object defined in the virtual panel definition means.

In the image generation system according to the invention, the viewpoint definition means can change the definition of the virtual viewpoint.

In the image generation system according to the invention, the virtual panel definition means can change the definition of the virtual object.

In the image generation system according to the invention, the moving image output apparatus is a moving image photograph apparatus comprising an enclosure being placed around a photograph subject and filled in with one color and a video camera being placed around the photograph subject for outputting a moving image provided by photographing the photograph subject.

The image generation system according to the invention further includes definition range control means in which the type of moving image output from the moving image output apparatus is previously entered, the definition range control means being responsive to the type of moving image for controlling the definition range of the virtual viewpoint defined in the viewpoint definition means or the virtual object defined in the virtual panel definition means.

According to another aspect of the invention, there is provided an image generation system for generating a virtual three-dimensional image based on computer graphics, the image generation system comprising viewpoint definition means for defining a virtual viewpoint placed in virtual three dimensions, object definition means for defining a virtual object displayed in the virtual three dimensions, virtual three-dimensional image generation means for generating a virtual three-dimensional image based on computer graphics from the virtual viewpoint defined in the viewpoint definition means, a moving image output apparatus for outputting a moving image based on the virtual viewpoint defined in the viewpoint definition means, and image combining means for generating a composite image into which the image generated in the virtual three-dimensional image generation means and the moving image output from the moving image output apparatus are combined.

In the image generation system according to the invention, the moving image output apparatus generates the moving image based on the virtual viewpoint defined in the viewpoint definition means and the virtual object defined in the object definition means.

In the image generation system according to the invention, the viewpoint definition means can change the definition of the virtual viewpoint.

In the image generation system according to the invention, the object definition means can change the definition of the virtual object.

According to another aspect of the invention, there is provided an image display system comprising the above-described image generation system for generating a virtual three-dimensional image for a right eye and a virtual three-dimensional image for a left eye, and a display for producing display so that the virtual three-dimensional image for the right eye generated by the image generation system is visible with a right eye and the virtual three-dimensional image for the left eye generated by the image generation system is visible with a left eye at the same time.

According to another aspect of the invention, there is provided a computer-readable record medium recording an image generation program for generating a virtual three-dimensional image based on computer graphics, the program for executing viewpoint definition step for defining a virtual viewpoint placed in virtual three dimensions, virtual panel definition step for defining a virtual object displayed in the virtual three dimensions and defining a virtual panel being placed in the virtual three dimensions, the virtual panel onto which a moving image is projected, based on the virtual viewpoint and the virtual object, moving image selection step for selecting a moving image to be projected onto the virtual panel from among a plurality of moving images output from a moving image output apparatus for outputting the plurality of moving images based on the virtual viewpoint defined at the viewpoint definition step, and virtual three-dimensional image generation step for placing the virtual panel defined at the virtual panel definition step in the virtual three dimensions, projecting the moving image selected at the moving image selection step onto the virtual panel, and generating an image from the virtual viewpoint defined at the viewpoint definition step.

According to another aspect of the invention, there is provided a computer-readable record medium recording an image generation program for generating a virtual three-dimensional image based on computer graphics, the program for executing viewpoint definition step for defining a virtual viewpoint placed in virtual three dimensions, virtual panel definition step for defining a virtual object displayed in the virtual three dimensions and defining a virtual panel being placed in the virtual three dimensions, the virtual panel onto which a moving image is projected, based on the virtual viewpoint and the virtual object, and virtual three-dimensional image generation step for placing the virtual panel defined at the virtual panel definition step in the virtual three dimensions, projecting a moving image output from a moving image output apparatus based on the virtual viewpoint defined at the viewpoint definition step onto the virtual panel, and generating a virtual three-dimensional image based on computer graphics from the virtual viewpoint defined at the viewpoint definition step.

According to another aspect of the invention, there is provided a computer-readable record medium recording an image generation program for generating a virtual three-dimensional image based on computer graphics, the program for executing viewpoint definition step for defining a virtual viewpoint placed in virtual three dimensions, object definition step for defining a virtual object displayed in the virtual three dimensions, virtual three-dimensional image generation step for generating a virtual three-dimensional image based on computer graphics from the virtual viewpoint defined in the viewpoint definition step, and image combining step for generating a composite image into which the image generated at the virtual three-dimensional image generation step and the moving image output from a moving image output apparatus based on the virtual viewpoint defined at the viewpoint definition step are combined.

According to another aspect of the invention, there is provided an image generation method for generating a virtual three-dimensional image based on computer graphics, the image generation method comprising the viewpoint definition step for defining a virtual viewpoint placed in virtual three dimensions, the virtual panel definition step for defining a virtual object displayed in the virtual three dimensions and defining a virtual panel being placed in the virtual three dimensions, the virtual panel onto which a moving image is projected, based on the virtual viewpoint and the virtual object, the moving image selection step for selecting a moving image to be projected onto the virtual panel from among a plurality of moving images output from a moving image output apparatus for outputting the plurality of moving images based on the virtual viewpoint defined at the viewpoint definition step, and the virtual three-dimensional image generation step for placing the virtual panel defined at the virtual panel definition step in the virtual three dimensions, projecting the moving image selected at the moving image selection step onto the virtual panel, and generating an image from the virtual viewpoint defined at the viewpoint definition step.

According to another aspect of the invention, there is provided an image generation method for generating a virtual three-dimensional image based on computer graphics, the image generation method comprising the viewpoint definition step for defining a virtual viewpoint placed in virtual three dimensions, the virtual panel definition step for defining a virtual object displayed in the virtual three dimensions and defining a virtual panel being placed in the virtual three dimensions, the virtual panel onto which a moving image is projected, based on the virtual viewpoint and the virtual object, and the virtual three-dimensional image generation step for placing the virtual panel defined at the virtual panel definition step in the virtual three dimensions, projecting a moving image output from a moving image output apparatus based on the virtual viewpoint defined at the viewpoint definition step onto the virtual panel, and generating a virtual three-dimensional image based on computer graphics from the virtual viewpoint defined at the viewpoint definition step.

According to another aspect of the invention, there is provided an image generation method for generating a virtual three-dimensional image based on computer graphics, the image generation method comprising the viewpoint definition step for defining a virtual viewpoint placed in virtual three dimensions, the object definition step for defining a virtual object displayed in the virtual three dimensions, the virtual three-dimensional image generation step for generating a virtual three-dimensional image based on computer graphics from the virtual viewpoint defined in the viewpoint definition step, and the image combining step for generating a composite image into which the image generated at the virtual three-dimensional image generation step and the moving image output from a moving image output apparatus based on the virtual viewpoint defined at the viewpoint definition step are combined.

DETAILED DESCRIPTION OF THE PRESENT INVENTION

Referring now to the accompanying drawings, there are shown preferred embodiments of image generation systems according to the invention.

First Embodiment

Figure 1:
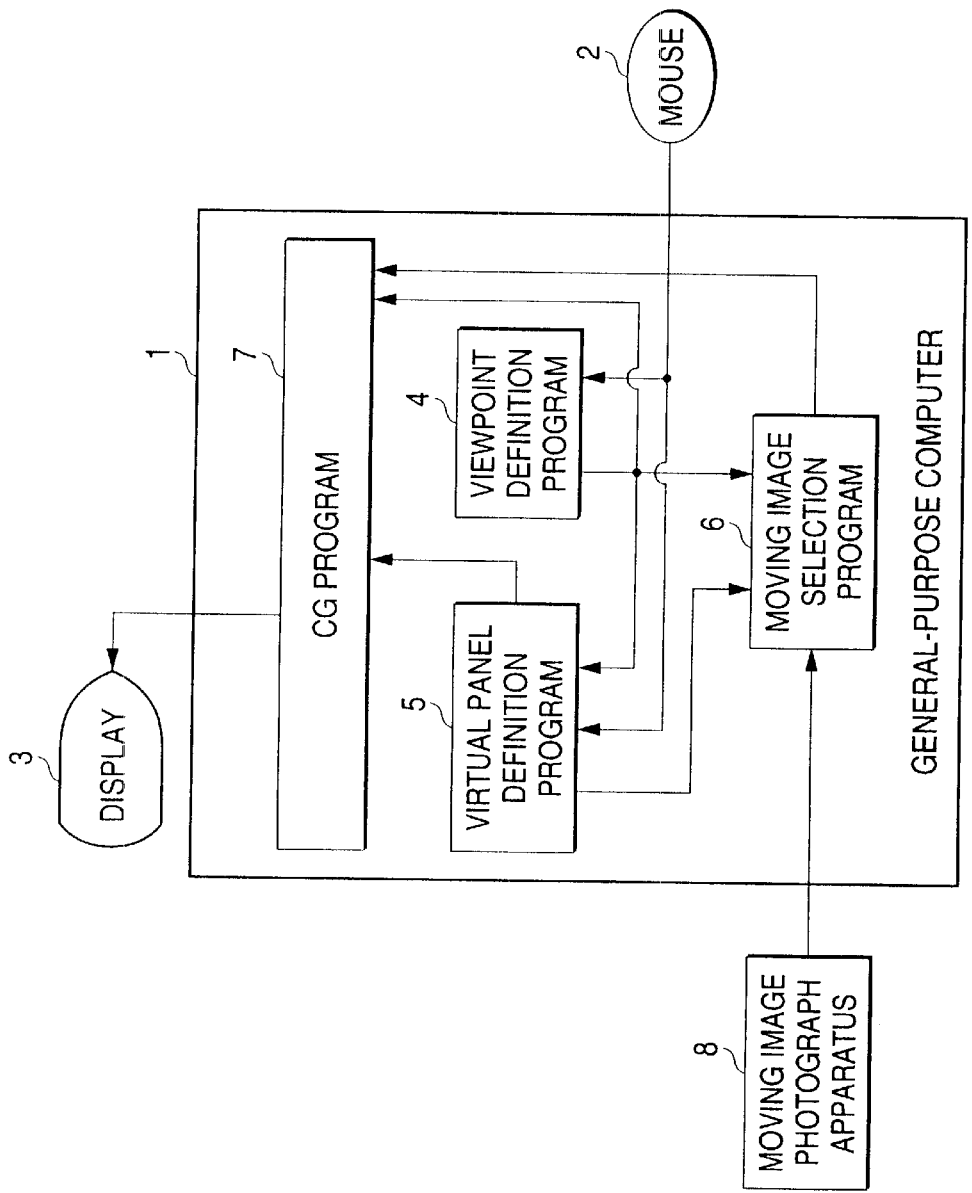
FIG. 1 is a block diagram to show the configuration of an image generation system of a first embodiment of the invention.

FIG. 1 is a block diagram to show the configuration of an image generation system according to a first embodiment of the invention. The image generation system comprises various programs, a general-purpose computer where the programs operate, peripheral machines, and a moving image photograph apparatus.

Numeral 1 denotes an image generation apparatus for generating a virtual three-dimensional image, here, a general-purpose computer for operating various programs. Numeral 2 denotes a mouse of an input unit for inputting an operation signal generated through the operator's operation. Numeral 3 denotes a display for displaying the virtual three-dimensional image generated in the general-purpose computer 1.

Numeral 4 denotes a viewpoint definition program for defining a virtual viewpoint placed in virtual three dimensions and the viewpoint definition program 4 corresponds to viewpoint definition means. Here, the position of the virtual viewpoint in the virtual three dimensions is defined. Here, the definition of the virtual viewpoint can be changed; the definition of the virtual viewpoint is changed based on the operation signal generated through the operator's operation input from the mouse 2.

Numeral 5 denotes a virtual panel definition program for defining a virtual object displayed in the virtual three dimensions and defining a virtual panel placed in the virtual three dimensions onto which a moving image is projected, based on the virtual viewpoint and the virtual object; the virtual panel definition program 5 corresponds to virtual panel definition means. Here, the position and orientation of the virtual object in the virtual three dimensions are defined and the orientation of the virtual panel is defined based on the virtual viewpoint defined in the viewpoint definition program 4 and the position of the virtual panel is defined based on the position of the virtual object. Here, the definition of the virtual object can be changed; the definition of the virtual object is changed based on the operation signal generated through the operator's operation input from the mouse 2.

Numeral 6 denotes a moving image selection program for selecting a moving image to be projected onto the virtual panel from among a plurality of moving images based on the virtual viewpoint defined in the viewpoint definition program 4; the moving image selection program 6 corresponds to moving image selection means. Here, the moving image to be projected onto the virtual panel is selected from among a plurality of moving images based on the virtual viewpoint defined in the viewpoint definition program 4 and the virtual object defined in the virtual panel definition program 5.

Numeral 7 denotes a CG program for creating virtual three dimensions in the general-purpose computer 1 using real-time CG, placing the virtual panel defined in the virtual panel definition program 5 in the virtual three dimensions, projecting the moving image selected in the moving image selection program 6 onto the virtual panel, and generating an image from the virtual viewpoint defined in the viewpoint definition program 4; the CG program 7 corresponds to virtual three-dimensional image generation means.

Numeral 8 denotes a moving image photograph apparatus for photographing a plurality of moving images projected onto the virtual panel and outputting to the general-purpose computer 1; the moving image photograph apparatus 8 corresponds to a moving image output apparatus.

The CG program 7 is a general program prepared using a graphics library of OpenGL, etc., for creating virtual three dimensions on a computer and generating an image from a virtual viewpoint. The CG program 7 can display a virtual three-dimensional image on the display 3. The operator can operate the mouse 2 to change the definition contents of the viewpoint definition program 4 for changing the placement of the virtual viewpoint in the virtual three dimensions.

Figure 2:
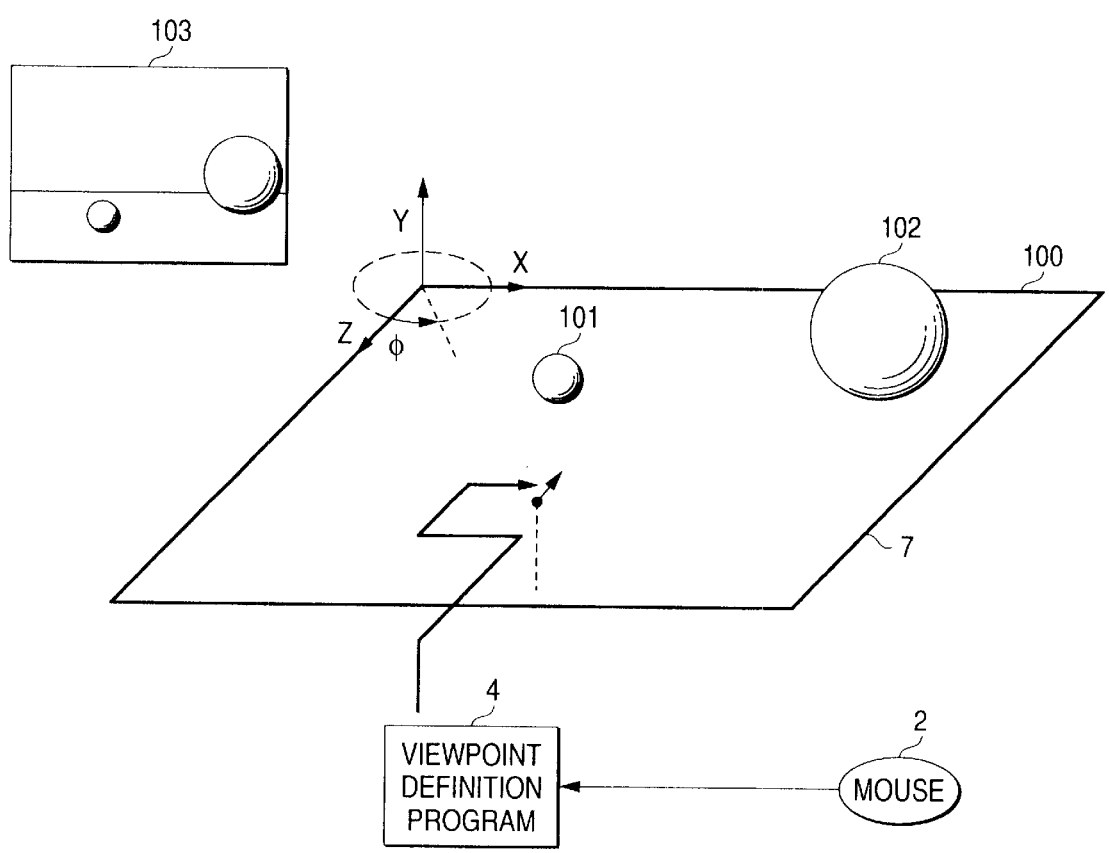
FIG. 2 is a schematic representation to describe generation of a normal virtual three-dimensional image.

First, how a general virtual three-dimensional image is generated will be discussed with reference to FIG. 2. FIG. 2 is a schematic representation to describe generation of a virtual three-dimensional image. Parts identical with those previously described with reference to FIG. 1 are denoted by the same reference numerals in FIG. 2 and will not be discussed again.

First, when the CG program 7 is started, virtual three dimensions 100 as shown in FIG. 2 are created. The flat object which seems to be a parallelogram is an example of a plane corresponding to a floor of a real space. A small spherical virtual object A 101 and a large spherical virtual object B 102 are examples of virtual objects such as buildings placed in the virtual three dimensions.

Next, when a virtual viewpoint is defined by the viewpoint definition program 4, the virtual viewpoint is placed in the virtual three dimensions and a virtual three-dimensional image 103 from the virtual viewpoint is generated. At this time, if the operator operates the mouse 2 to enter a predetermined operation signal, the definition of the virtual viewpoint is changed by the viewpoint definition program 4 and an image from a different virtual viewpoint corresponding to the operation signal is provided.

Since the CG program 7 updates the image from the virtual viewpoint about 10 times a second, the virtual viewpoint is moved smoothly as desired, whereby an image as if the operator walked about the virtual three dimensions can be generated.

Figure 3:
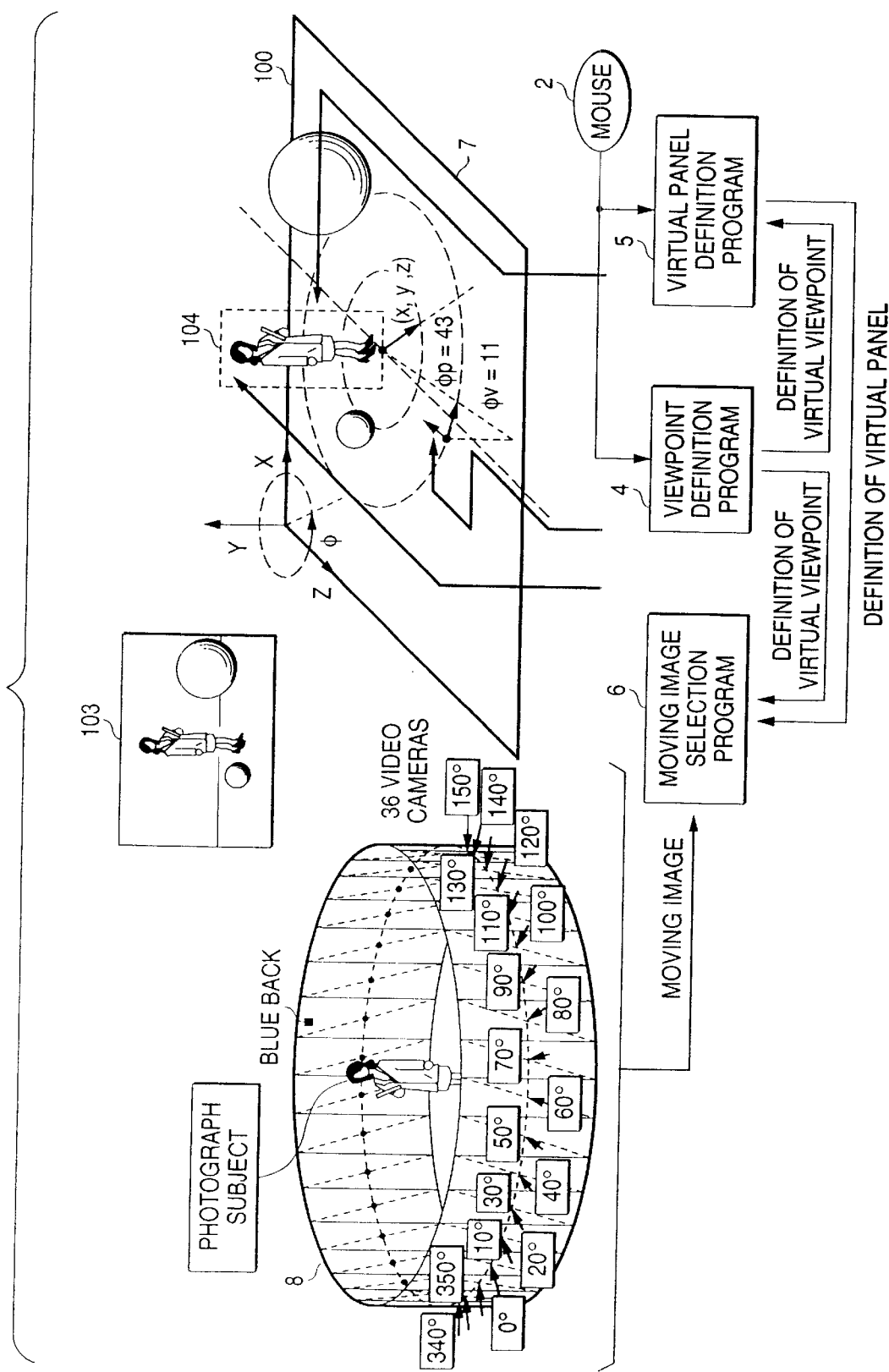
FIG. 3 is a detailed block diagram to show the detailed configuration of the image generation system of the first embodiment of the invention.

The operation of the image generation system of the first embodiment of the invention will be discussed with reference to FIG. 3. FIG. 3 is a detailed block diagram to show the detailed configuration of the image generation system according to the first embodiment of the invention. Parts identical with those previously described with reference to FIGS. 1 and 2 are denoted by the same reference numerals in FIG. 3 and will not be discussed again. The configuration in FIG. 3 comprises the virtual panel definition program 5, the moving image selection program 6, and the moving image photograph apparatus 8 added to the system in FIG. 2. Here, by way of example, a human figure is displayed as a virtual object in the virtual three dimensions and is called human figure object.

First, the viewpoint definition program 4 defines the position of a virtual viewpoint placed in the virtual three dimensions. The virtual panel definition program 5 defines the position and the orientation in the virtual three dimensions, of the human figure object placed in the virtual three dimensions. Upon reception of the position information of the virtual viewpoint defined in the viewpoint definition program 4, the virtual panel definition program 5 defines the orientation of the virtual panel so that the virtual panel always faces the front relative to the virtual viewpoint and defines the position of the virtual panel so that the position becomes the same as the position of the human figure object.

Then, the CG program 7 places virtual panel 104 comprising one rectangular polygon in the virtual three dimensions based on the position and the orientation of the virtual panel defined in the virtual panel definition program 5. In the virtual three dimensions, rectangular coordinates comprising three axes of X, Y, and Z and counterclockwise bearing angle φ with the Y axis as the center with the positive direction of the Z axis as the reference are defined. The plane corresponding to a floor is XZ plane and the direction corresponding to up is the positive direction of the Y axis. For convenience, the virtual panel 104 has the middle point of the lower side, which will be hereinafter referred to as the reference point, matched with the coordinates on the XZ plane of the position of the human figure object and is placed perpendicularly to the XZ plane. The length and width dimensions of the virtual panel 104 are constant.

On the other hand, the moving image photograph apparatus 8 is made up of 36 video cameras placed around the human figure of the photograph subject counterclockwise at 10° intervals with the position of the photograph subject front as 0° and a wall filled in with blue around the human figure (generally called blue back) for photographing the subject from a plurality of directions at the same time with the plurality of video cameras through small holes made in the wall filled in with blue. Here, as generally executed in image production, image processing of removing the blue portion in the moving image is performed, thereby outputting a moving image with any other portion than the photograph subject in the moving image made transparent.

The moving image selection program 6 selects one from among the moving images photographed by the 36 video cameras of the moving image photograph apparatus 8, and the CG program 7 projects the moving image onto the virtual panel 104 placed in the virtual three dimensions. The moving image to be selected is determined by applying the definition contents of the viewpoint definition program 4 and the virtual panel definition program 5 to the following expression (1):

$$\phi m = \text{int}((\text{mod}(360-(\phi p-\phi v), 360)+5)/10)*10 \quad (1)$$

where φp is the bearing angle that the human figure object in the virtual three dimensions faces (orientation of the human figure object), φv is the bearing angle of the virtual viewpoint from the reference point of the human figure object (position of the human figure object), and φm is the position of the video camera photographing the selected moving image. int (a) is function for returning the integer part of numeric value a and function mod (b, c) is function for returning the remainder resulting from dividing numeric value b by numeric value c. For example, assuming that the bearing angle that the human figure object faces, φp, is 43° and that the bearing angle of the virtual viewpoint from the reference point of the human figure object, φv, is 11°, as shown in FIG. 3, φm is calculated as 330°. Thus, the moving image selection program 6 selects the moving image with the human figure photographed from the 330° direction.

The CG program 7 projects the moving image selected by the moving image selection program 6 onto the virtual panel 104 placed based on the definition of the virtual panel definition program 5, generates an image from the virtual viewpoint defined in the viewpoint definition program 4, and displays the virtual three-dimensional image on the display 3. Thus, the moving image being photographed is selected in response to the position of the virtual viewpoint and the position and the orientation of the human figure object and is projected on the virtual panel 104 and the virtual three-dimensional image is generated, so that if the general purpose computer 1 does not have an enormous storage capacity, a real human figure object can also be displayed.

Here, if the operator operates the mouse 2 to change the position of the virtual viewpoint, the operation signal is input to the viewpoint definition program 4, which then changes the definition of the virtual viewpoint in response to the operation signal. For example, assume that the virtual viewpoint is changed from the state in FIG. 3 to the right of the human figure object, quantitatively the bearing angle of the virtual viewpoint from the reference point of the human figure object, φv, is changed from 11° to 56°.

Then, the moving image selection program 6 receives the position information of the changed virtual viewpoint from the viewpoint definition program 4 and again calculates φm from expression (1). Since the value of φm is calculated as 10°, the moving image selection program 6 selects the 10° moving image photographed by the moving image photograph apparatus 8. The virtual panel definition program 5 changes the definition of the virtual panel so that the virtual panel faces the front relative to the virtual viewpoint based on the definition of the virtual viewpoint changed by the viewpoint definition program 4.

The CG program 7 projects the moving image selected by the moving image selection program 6 onto the virtual panel 104 placed based on the definition of the virtual panel definition program 5, generates an image from the virtual viewpoint defined in the viewpoint definition program 4, and displays the virtual three-dimensional image on the display 3.

Thus, if the position of the virtual viewpoint is changed, appropriate moving images are selected one after another and projected on the virtual panel 104 and the virtual three-dimensional images are generated, so that the human figure object changed in view following the viewpoint move can be displayed as if a virtual object formed of polygons were displayed.

Here, if the operator operates the mouse 2 to change the position and the orientation of the human figure object, the operation signal is input to the virtual panel definition program 5, which then changes the definition of the human figure object and the definition of the virtual panel in response to the operation signal. For example, assume that the bearing angle of the human figure object is changed clockwise from the state in FIG. 3, quantitatively the bearing angle that the human figure object faces, φp, is changed from 43° to 350°. In this case, the position of the human figure object is not changed and therefore the definition of the virtual panel is not changed. If the position of the human figure object is changed, the definition of the virtual panel is changed matching the position of the human figure object and the definition of the orientation of the virtual panel is also changed so that the virtual panel faces the front relative to the virtual viewpoint.

When the definition of the human figure object is changed, the moving image selection program 6 receives the changed definition of the human figure object, here, the information of the bearing angle that the human figure object faces (orientation of the human figure object) from the virtual panel definition program 5 and again calculates φm from expression (1). Since the value of φm is calculated as 20°, the moving image selection program 6 selects the 20 moving image photographed by the moving image photograph apparatus 8.

The CG program 7 projects the moving image selected by the moving image selection program 6 onto the virtual panel 104 placed based on the definition of the virtual panel definition program 5, generates an image from the virtual viewpoint defined in the viewpoint definition program 4, and displays the virtual three-dimensional image on the display 3.

Thus, if the bearing angle or the position of the human figure object is changed, appropriate moving images are selected one after another and projected on the virtual panel 104 and the virtual three-dimensional images are generated, so that the human figure object changed in view following change in the position or the bearing angle can be displayed as if a virtual object formed of polygons were displayed.

As described above, according to the first embodiment of the invention, a moving image responsive to the definitions of the virtual viewpoint and the human figure object is selected from a plurality of moving images provided by photographing from a plurality of directions a human figure displayed in the virtual three dimensions as a virtual object, the selected moving image provided by photographing is projected onto the virtual panel defined based on the definitions of the virtual viewpoint and the human figure object and placed in the virtual three dimensions, and an image from the virtual viewpoint is generated, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images photographed by the moving image photograph apparatus in the general-purpose computer, for example, because the moving image photograph apparatus and the general-purpose computer differ in processing speed, only the moving image corresponding to the selected one of the 36 video cameras may be stored temporarily and even a general-purpose computer having a small storage capacity would be able to generate an image capable of really displaying the object of a human being, an animal, a plant, etc., having curved surface portions and motion.

The definition of the virtual viewpoint is changed based on the operation signal generated through the operator's operation, a moving image is again selected based on the definition of the human figure object and the changed definition of the virtual viewpoint, the selected moving image is projected on the virtual panel whose definition is changed based on the definition of the human figure object and the changed definition of the virtual viewpoint, and an image from the virtual viewpoint is generated, whereby if the position of the virtual viewpoint is changed, appropriate moving images are selected one after another and the virtual three-dimensional images are generated, so that an image capable of displaying the human figure object changed in view following the viewpoint move responsive to the operator's will as if a virtual object formed of polygons were displayed can be generated.

The definition of the position of the human figure object is changed based on the operation signal generated through the operator's operation, a moving image is again selected based on the definition of the virtual viewpoint and the changed definition of the position of the human figure object, the selected moving image is projected on the virtual panel whose definition is changed based on the definition of the virtual viewpoint and the changed definition of the human figure object, and an image from the virtual viewpoint is generated, whereby if the position of the human figure object is changed, appropriate moving images are selected one after another and the virtual three-dimensional images are generated, so that an image capable of displaying the human figure object changed in view following the move of the human figure object responsive to the operator's will as if a virtual object formed of polygons were displayed can be generated.

The definition of the orientation of the human figure object is changed based on the operation signal generated through the operator's operation, a moving image is again selected based on the definition of the virtual viewpoint and the changed definition of the orientation of the human figure object, the selected moving image is projected on the virtual panel, and an image from the virtual viewpoint is generated, whereby if the orientation of the human figure object is changed, appropriate moving images are selected one after another and the virtual three-dimensional images are generated, so that an image capable of displaying the human figure object changed in view following the change in the orientation of the human figure object responsive to the operator's will as if a virtual object formed of polygons were displayed can be generated.

The moving image photograph apparatus is made up of 36 video cameras placed around the human figure of the photograph subject and a wall filled in with blue around the human figure (enclosure) for photographing the subject from a plurality of directions at the same time with the plurality of video cameras through small holes made in the wall filled in with blue and performing image processing of removing the blue portion in the moving image, thereby outputting a moving image with any other portion than the photograph subject made transparent. Thus, an image capable of displaying only the human figure of the photograph subject as a virtual object can be generated.

Second Embodiment

In the described first embodiment, the moving image photograph apparatus for photographing a plurality of moving images is used as the moving image output apparatus. Next, a second embodiment of the invention using a high-performance computer for generating a plurality of moving images as moving image output apparatus will be discussed.

Figure 4:
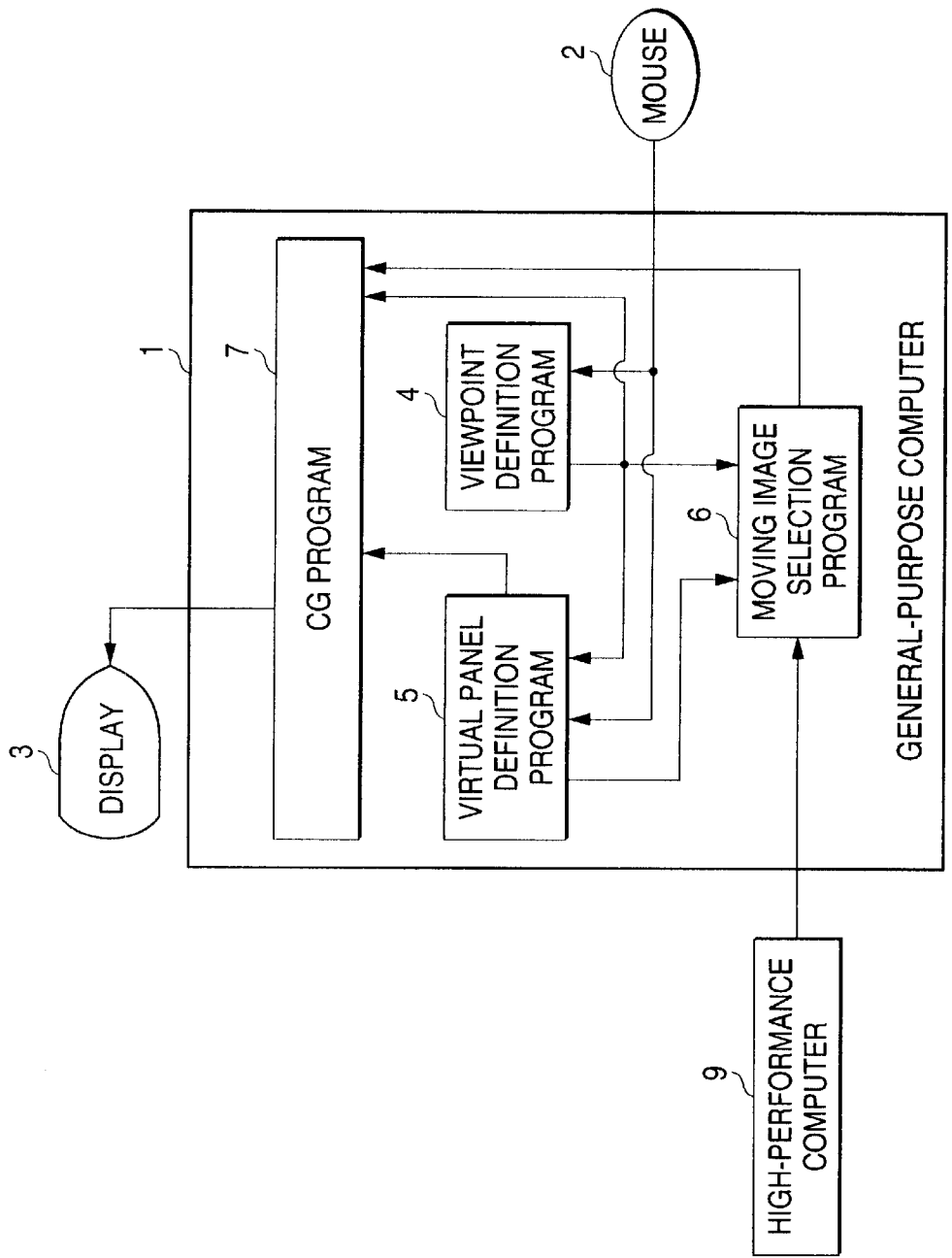
FIG. 4 is a block diagram to show the configuration of an image generation system of a second embodiment of the invention.

FIG. 4 is a block diagram to show the configuration of an image generation system according to the second embodiment of the invention. Parts identical with or similar to those previously described with reference to FIG. 1 are denoted by the same reference numerals in FIG. 4. The image generation system comprises various programs, a general-purpose computer 1 where the programs operate, peripheral machines of a mouse 2 and a display 3, and a high-performance computer 9 that can generate an image of a virtual object made up of polygons exceeding several tens of thousands of polygons at high speed. The high-performance computer 9 corresponds to a moving image output apparatus. A viewpoint definition program 4, a virtual panel definition program 5, a moving image selection program 6, and a CG program 7 are programs executed on the general-purpose computer 1 like those in the first embodiment.

As described in [Related Art], about several hundreds of thousands of polygons are necessary for really displaying a human figure object using polygons in virtual three dimensions. The high-performance computer 9 is a computer capable of generating an image of a virtual object made up of a large number of polygons at high speed. For example, a high-ranked graphics workstation of Silicon Graphics USA is applied.

The operation of the image generation system is as follows: First, virtual three dimensions based on real-time CG are created on the high-performance computer 9 and a virtual object made up of about several hundreds of thousands of polygons, for example, a polygon model of a human figure is placed. Motion of walk, dance, etc., is given to the polygon model of the human figure. Next, a plurality of virtual viewpoints are placed in the virtual three dimensions on the high-performance computer 9. For example, 36 virtual viewpoints are placed like a circle at 10° intervals counterclockwise from the front of the polygon model of the human figure with the polygon model of the human figure as the center. Here, the high-performance computer 9 generates 36 types of images at the same time from the 36 virtual viewpoints in the high-performance computer 9. The images are moving images because motion is defined for the polygon model of the human figure. The moving images will be called 0° to 350° moving images.

On the other hand, the operation of the general-purpose computer 1 is similar to that in the first embodiment. The moving image selection program 6 selects one moving image from the 0° to 350° moving images generated by the high-performance computer 9 in place of the 0° to 350° moving images photographed by the moving image photograph apparatus 8 in the first embodiment. The CG program 7 projects the selected moving image on a virtual panel 104, generates an image from the virtual viewpoint, and displays the virtual three-dimensional image on the display 3.

Here, if the operator operates the mouse 2 to change the definition of the virtual viewpoint or the human figure object, the operation signal is input to the viewpoint definition program 4 or the virtual panel definition program 5, which then changes the definition of the virtual viewpoint or the human figure object in the virtual three dimensions. Then, as in the first embodiment, the moving image selection program 6 immediately selects a different moving image and the CG program 7 projects the selected moving image on the virtual panel 104, generates an image, and displays the virtual three-dimensional image on the display 3.

Thus, if the position of the virtual viewpoint or the orientation or the position of the human figure object is changed by the operator who operates the mouse 2, appropriate moving images are selected one after another and projected on the virtual panel 104, so that the human figure object changed in view following the change in the position of the virtual viewpoint or the orientation or the position of the human figure object can be displayed as if an object formed of polygons were displayed.

As described above, according to the second embodiment of the invention, a moving image responsive to the definitions of the virtual viewpoint and the human figure object is selected from a plurality of moving images from a plurality of virtual viewpoints for the polygon model of the human figure having motion, generated at the same time by the high-performance computer, the selected moving image provided by photographing is projected onto the virtual panel defined based on the definitions of the virtual viewpoint and the human figure object and placed in the virtual three dimensions, and an image from the virtual viewpoint is generated, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images generated by the high-performance computer in the general-purpose computer, for example, because the high-performance computer and the general-purpose computer differ in processing speed, only the selected one of the 36 moving images may be stored temporarily and even a general-purpose computer having a small storage capacity would be able to generate an image capable of really displaying the object of a human being, an animal, a plant, etc., having curved surface portions and motion.

The definition of the virtual viewpoint, the definition of the human figure object, and/or the definition of the virtual panel is changed based on the operation signal generated through the operator's operation as in the first embodiment, a moving image is again selected based on the changed definition and is projected on the virtual panel, and an image from the virtual viewpoint is generated, whereby if the position of the virtual viewpoint, the position of the human figure object, and/or the orientation of the human figure object is changed, appropriate moving images are selected one after another and the virtual three-dimensional images are generated, so that an image capable of displaying the human figure object changed in view in response to the operator's will as if a virtual object formed of polygons were displayed can be generated.

Third Embodiment

In the described second embodiment, the high-performance computer for generating a plurality of moving images at the same time is used as the moving image output apparatus. Next, a third embodiment of the invention using a high-performance computer for generating an moving image based on definitions of a virtual viewpoint and a human figure object as moving image output apparatus will be discussed.

Figure 5:
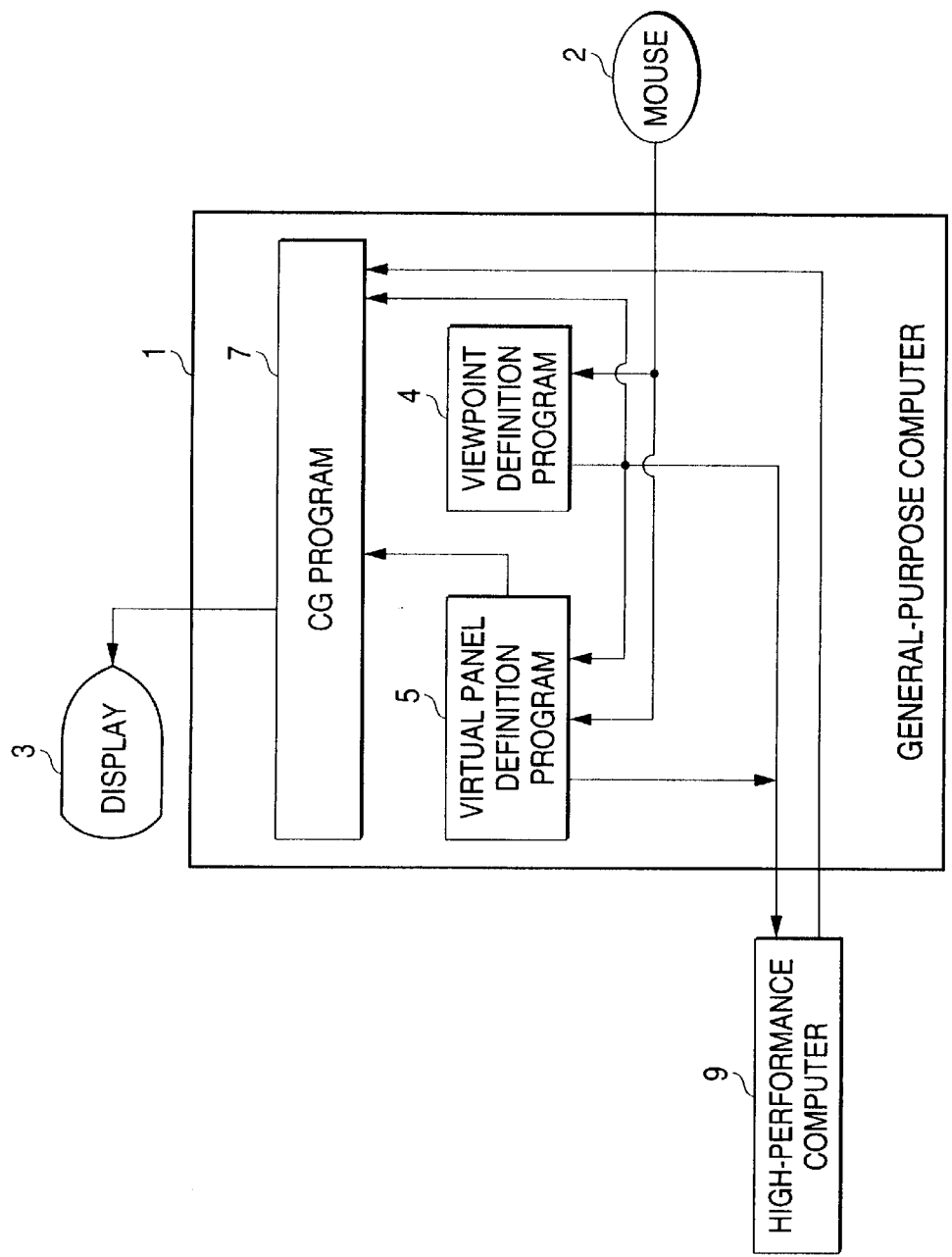
FIG. 5 is a block diagram to show the configuration of an image generation system of a third embodiment of the invention.

FIG. 5 is a block diagram to show the configuration of an image generation system according to the third embodiment of the invention. Parts identical with or similar to those previously described with reference to FIG. 1 are denoted by the same reference numerals in FIG. 5. The image generation system comprises various programs, a general-purpose computer 1 where the programs operate, peripheral machines of a mouse 2 and a display 3, and a high-performance computer 9 that can generate an image of a virtual object made up of polygons exceeding several tens of thousands of polygons at high speed. The high-performance computer 9 corresponds to a moving image output apparatus. A viewpoint definition program 4, a virtual panel definition program 5, and a CG program 7 are programs executed on the general-purpose computer 1 like those in the second embodiment.

The operation of the image generation system is as follows: First, virtual three dimensions based on real-time CG are created on the high-performance computer 9 and a polygon model of a human figure made up of about several hundreds of thousands of polygons is placed as in the second embodiment. Motion of walk, dance, etc., is given to the polygon model of the human figure. Next, the high-performance computer 9 receives the position information of the virtual viewpoint defined in the viewpoint definition program 4 of the general-purpose computer 1 and the information of the position and the orientation of the human figure object defined in the virtual panel definition program 5. Subsequently, from the information, the high-performance computer 9 obtains the bearing angle that the human figure object in the virtual three dimensions faces (orientation of the human figure object), φp, and the bearing angle of the virtual viewpoint from the reference point of the human figure object (position of the human figure object), φv, and assigns them to the following expression (2) to calculate φm:

$$\phi m = \mod(360 - (\phi p - \phi v), 360) \qquad (2)$$

Next, the high-performance computer 9 places the virtual viewpoint in the virtual three dimensions on the high-performance computer 9 at the angle of φm counterclockwise from the front on the circumference with the polygon model of the human figure object as the center in the virtual three dimensions on the high-performance computer 9, and generates a moving image of the polygon model of the human figure object from the virtual viewpoint. The CG program 7 of the general-purpose computer 1 receives the generated moving image and as in the above-described embodiment, projects the received moving image on a virtual panel 104, generates an image from the virtual viewpoint, and displays the virtual three-dimensional image on the display 3.

Here, if the operator operates the mouse 2 to change the definition of the virtual viewpoint or the human figure object, the operation signal is input to the viewpoint definition program 4 or the virtual panel definition program 5, which then changes the definition of the virtual viewpoint or the definition of the human figure object in the virtual three dimensions. Then, the high-performance computer 9 immediately again places the virtual viewpoint or the human figure object in the virtual three dimensions on the high-performance computer 9 and generates a different moving image of the polygon model of the human figure. The CG program 7 of the general-purpose computer 1 receives the moving image, projects the received moving image on the virtual panel 104, generates an image from the virtual viewpoint, and displays the virtual three-dimensional image on the display 3.

Thus, if the position of the virtual viewpoint or the bearing angle or the position of the human figure object in the virtual three dimensions on the general-purpose computer 1 is changed by the operator who operates the mouse 2, appropriate moving images are generated one after another and projected on the virtual panel 104, so that the human figure object changed in view following the change in the position of the virtual viewpoint or the position or the bearing angle of the human figure object can be displayed as if an object formed of polygons were displayed.

As described above, according to the third embodiment of the invention, a moving image of the polygon model of the human figure having motion, generated by the high-performance computer based on the definitions of the virtual viewpoint and the human figure object on the general-purpose computer is projected onto the virtual panel defined based on the definitions of the virtual viewpoint and the human figure object and placed in the virtual three dimensions on the general-purpose computer, and an image from the virtual viewpoint is generated, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images generated by the high-performance computer in the general-purpose computer, for example, because the high-performance computer and the general-purpose computer differ in processing speed, only one moving image may be stored temporarily and even a general-purpose computer having a small storage capacity would be able to generate an image capable of really displaying the object of a human being, an animal, a plant, etc., having curved surface portions and motion.

The definition of the virtual viewpoint, the definition of the human figure object, and/or the definition of the virtual panel is changed based on the operation signal generated through the operator's operation as in the above-described embodiment, the moving image generated by the high-performance computer is projected on the virtual panel based on the changed definition, and an image from the virtual viewpoint is generated, whereby if the position of the virtual viewpoint, the position of the human figure object, and/or the orientation of the human figure object is changed, appropriate moving images are projected one after another and the virtual three-dimensional images are generated, so that an image capable of displaying the human figure object changed in view in response to the operator's will as if a virtual object formed of polygons were displayed can be generated.

Fourth Embodiment

In the described third embodiment, the high-performance computer for generating a moving image based on the definitions of the virtual viewpoint and the human figure object is used as the moving image output apparatus. Next, a fourth embodiment of the invention using a movable moving image photograph apparatus for photographing a human figure based on definitions of a virtual viewpoint and a human figure object as moving image output apparatus will be discussed.

Figure 6:
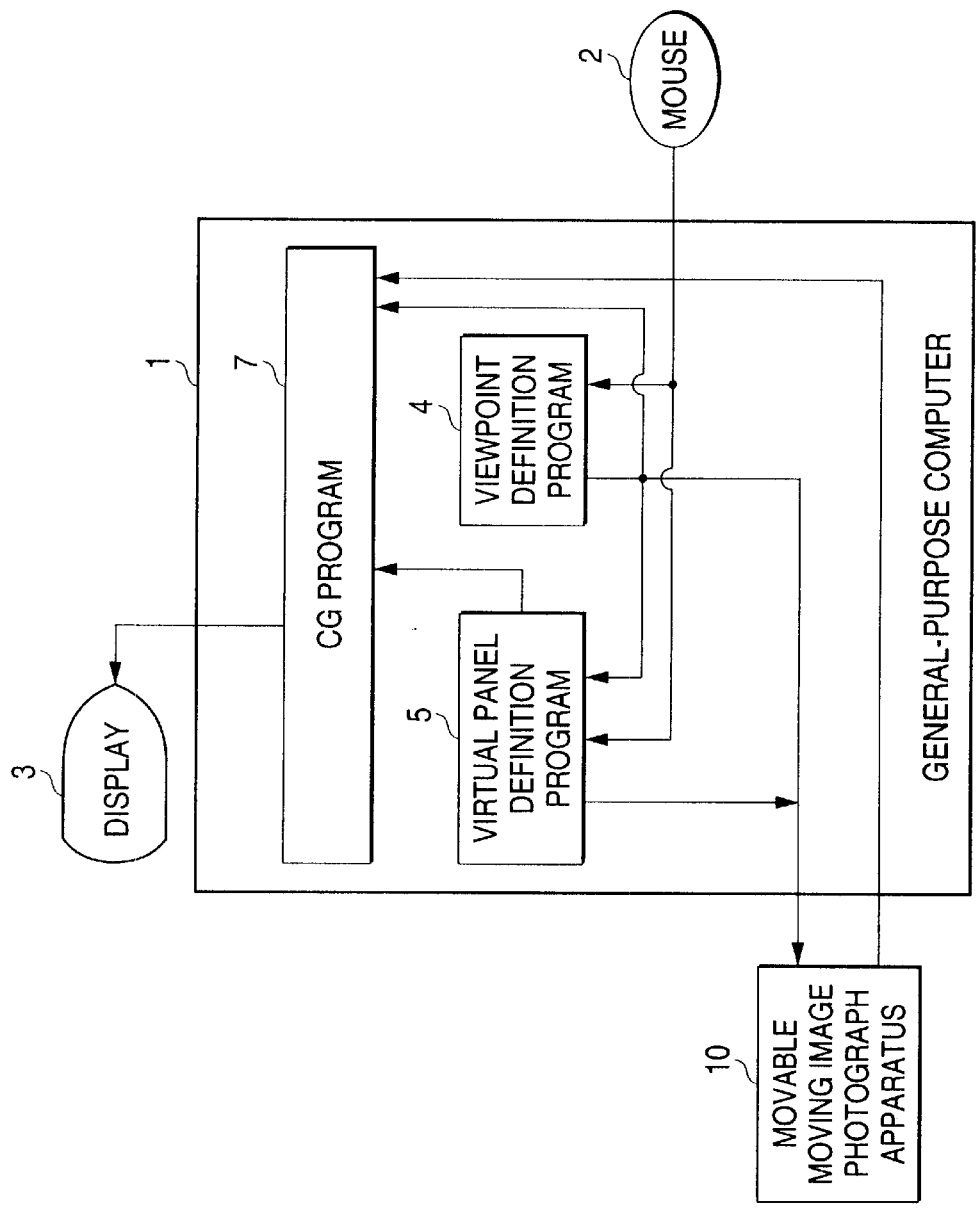
FIG. 6 is a block diagram to show the configuration of an image generation system of a fourth embodiment of the invention.

FIG. 6 is a block diagram to show the configuration of an image generation system according to the fourth embodiment of the invention. Parts identical with or similar to those previously described with reference to FIG. 1 are denoted by the same reference numerals in FIG. 6. The image generation system comprises various programs, a general-purpose computer 1 where the programs operate, peripheral machines of a mouse 2 and a display 3, and a movable moving image photograph apparatus 10 which corresponds to a moving image output apparatus and comprises a video camera attached to the tip of an arm of an industrial robot, for example, wherein the position of the video camera can be changed by an electric signal. A viewpoint definition program 4, a virtual panel definition program 5, and a CG program 7 are programs executed on the general-purpose computer 1 like those in the second embodiment.

The operation of the image generation system is as follows: First, the movable moving image photograph apparatus 10 receives the position information of the virtual viewpoint in virtual three dimensions defined in the viewpoint definition program 4 of the general-purpose computer 1 and the information of the position and the orientation of the human figure object defined in the virtual panel definition program 5. Next, from the information, the movable moving image photograph apparatus 10 obtains the bearing angle that the human figure object faces (orientation of the human figure object), $\phi p$, and the bearing angle of the virtual viewpoint from the reference point of the human figure object (position of the human figure object), $\phi v$, and calculates $\phi m$ from expression (2) shown in the second embodiment. Subsequently, the movable moving image photograph apparatus 10 moves the video camera in the direction corresponding to $\phi m$ from the photograph subject and photographs the photograph subject. The CG program 7 of the general-purpose computer 1 receives the moving image photographed with the video camera and as in the above-described embodiment, projects the received moving image on a virtual panel in the virtual three dimensions, generates an image from the virtual viewpoint, and displays the virtual three-dimensional image on the display 3.

Here, if the operator operates the mouse 2 to change the definition of the virtual viewpoint or the human figure object, the operation signal is input to the viewpoint definition program 4 or the virtual panel definition program 5, which then changes the definition of the virtual viewpoint or the definition of the human figure object in the virtual three dimensions. Then, the movable moving image photograph apparatus 10 immediately changes the placement of the video camera and photographs the photograph subject from a different direction. The CG program 7 of the general-purpose computer 1 receives the moving image, projects the received moving image on the virtual panel 104, generates an image from the virtual viewpoint, and displays the virtual three-dimensional image on the display 3.

Thus, if the position of the virtual viewpoint or the bearing angle or the position of the human figure object in the virtual three dimensions on the general-purpose computer 1 is changed by the operator who operates the mouse 2, appropriate moving images are photographed one after another and projected on the virtual panel 104, so that the human figure object changed in view following the change in the position of the virtual viewpoint or the position or the bearing angle of the human figure object can be displayed as if an object formed of polygons were displayed.

As described above, according to the fourth embodiment of the invention, a moving image of the human figure photographed by the movable moving image photograph apparatus based on the definitions of the virtual viewpoint and the human figure object on the general-purpose computer is projected onto the virtual panel defined based on the definitions of the virtual viewpoint and the human figure object and placed in the virtual three dimensions on the general-purpose computer, and an image from the virtual viewpoint is generated, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images generated by the movable moving image photograph apparatus in the general-purpose computer, for example, because the movable moving image photograph apparatus and the general-purpose computer differ in processing speed, only one moving image may be stored temporarily and even a general-purpose computer having a small storage capacity would be able to generate an image capable of really displaying the object of a human being, an animal, a plant, etc., having curved surface portions and motion.

The definition of the virtual viewpoint, the definition of the human figure object, and/or the definition of the virtual panel is changed based on the operation signal generated through the operator's operation as in the above-described embodiment, the moving image photographed by the movable moving image photograph apparatus is projected on the virtual panel based on the changed definition, and an image from the virtual viewpoint is generated, whereby if the position of the virtual viewpoint, the position of the human figure object, and/or the orientation of the human figure object is changed, appropriate moving images are projected one after another and the virtual three-dimensional images are generated, so that an image capable of displaying the human figure object changed in view in response to the operator's will as if a virtual object formed of polygons were displayed can be generated.

Like the moving image photograph apparatus of the first embodiment, the movable moving image photograph apparatus of the fourth embodiment may also comprise a wall filled in with blue around the human figure of the photograph subject (enclosure) for photographing the subject through a small hole made in the wall and performing image processing of removing the blue portion in the moving image for outputting a moving image with any other portion than the photograph subject made transparent in the moving image. Thus, an image capable of displaying only the human figure of the photograph subject as a virtual object can be generated.

Fifth Embodiment

In the above-described embodiments, the current moving image photographed or the current moving image generated is projected onto the virtual panel and the virtual three-dimensional image is generated. Next, a fifth embodiment of the invention for projecting a provided moving image on a virtual panel and generating a virtual three-dimensional image will be discussed.

Figure 7:
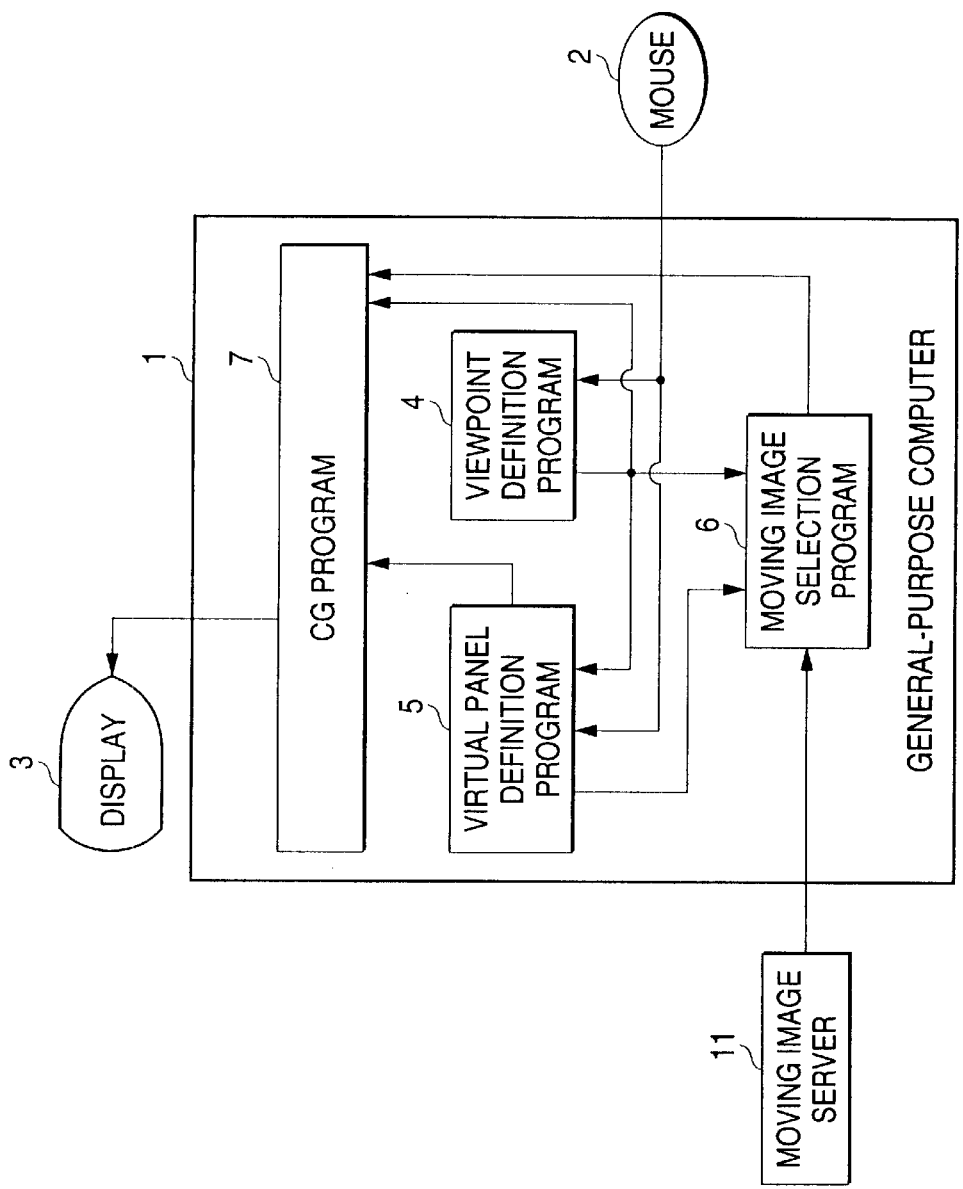
FIG. 7 is a block diagram to show the configuration of an image generation system of a fifth embodiment of the invention.

FIG. 7 is a block diagram to show the configuration of an image generation system according to the fifth embodiment of the invention. Parts identical with or similar to those previously described with reference to FIG. 1 are denoted by the same reference numerals in FIG. 7. The image generation system comprises various programs, a general-purpose computer 1 where the programs operate, peripheral machines of a mouse 2 and a display 3 connected to the general-purpose computer 1, and a moving image server 11, which corresponds to a moving image output apparatus, for distributing moving images to the general-purpose computer 1. A viewpoint definition program 4, a virtual panel definition program 5, a moving image selection program 6, and a CG program 7 are programs executed on the general-purpose computer 1 like those in the second embodiment.

The operation of the image generation system is as follows: Moving images provided by photographing a photograph subject such as a human figure with a video camera from various angles are previously stored in the moving image server 11. For example, the moving images are provided by photographing a photograph subject at 36 points at 10° intervals from 0° to 350° from the front. First, the moving image server 11 distributes the moving images to the general-purpose computer 1.

On the other hand, the operation of the parts in the general-purpose computer 1 is similar to that in the first embodiment. The moving image selection program 6 selects one moving image from the 0° to 350° moving images distributed by the moving image server 11 in place of the 0° to 350° moving images photographed by the moving image photograph apparatus 8 in the first embodiment. The CG program 7 projects the selected moving image on a virtual panel 104, generates an image from the virtual viewpoint, and displays the virtual three-dimensional image on the display 3.

Here, if the operator operates the mouse 2 to change the definition of the virtual viewpoint or the human figure object, the operation signal is input to the viewpoint definition program 4 or the virtual panel definition program 5, which then changes the definition of the virtual viewpoint or the human figure object in the virtual three dimensions. Then, as in the first embodiment, the moving image selection program 6 immediately selects a different moving image and the CG program 7 projects the selected moving image on the virtual panel 104, generates an image, and displays the virtual three-dimensional image on the display 3.

Thus, if the position of the virtual viewpoint or the orientation or the position of the human figure object is changed by the operator who operates the mouse 2, appropriate moving images are selected one after another and projected on the virtual panel 104, so that the human figure object changed in view following the change in the position of the virtual viewpoint or the orientation or the position of the human figure object can be displayed as if an object formed of polygons were displayed.

As described above, according to the fifth embodiment of the invention, a moving image responsive to the definitions of the virtual viewpoint and the human figure object is selected from a plurality of moving images from a plurality of virtual viewpoints distributed from the moving image server, the distributed moving image is projected onto the virtual panel defined based on the definitions of the virtual viewpoint and the human figure object and placed in the virtual three dimensions, and an image from the virtual viewpoint is generated, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images distributed from the moving image server in the general-purpose computer, for example, because the moving image server and the general-purpose computer differ in processing speed, only the selected one of the moving images may be stored temporarily in the general-purpose computer and even a general-purpose computer having a small storage capacity would be able to generate an image capable of really displaying the object of a human being, an animal, a plant, etc., having curved surface portions and motion.

The definition of the virtual viewpoint, the definition of the human figure object, and/or the definition of the virtual panel is changed based on the operation signal generated through the operator's operation as in the above-described embodiment, a moving image distributed from the moving image server is again selected based on the changed definition and is projected on the virtual panel, and an image from the virtual viewpoint is generated, whereby if the position of the virtual viewpoint, the position of the human figure object, and/or the orientation of the human figure object is changed, appropriate moving images are selected one after another and the virtual three-dimensional images are generated, so that an image capable of displaying the human figure object changed in view in response to the operator's will as if a virtual object formed of polygons were displayed can be generated.

Sixth Embodiment

In the described fifth embodiment, the moving image server for distributing a plurality of moving images is used as the moving image output apparatus. Next, a sixth embodiment of the invention using a moving image server for distributing an moving image based on definitions of a virtual viewpoint and a human figure object as moving image output apparatus will be discussed.

Figure 8:
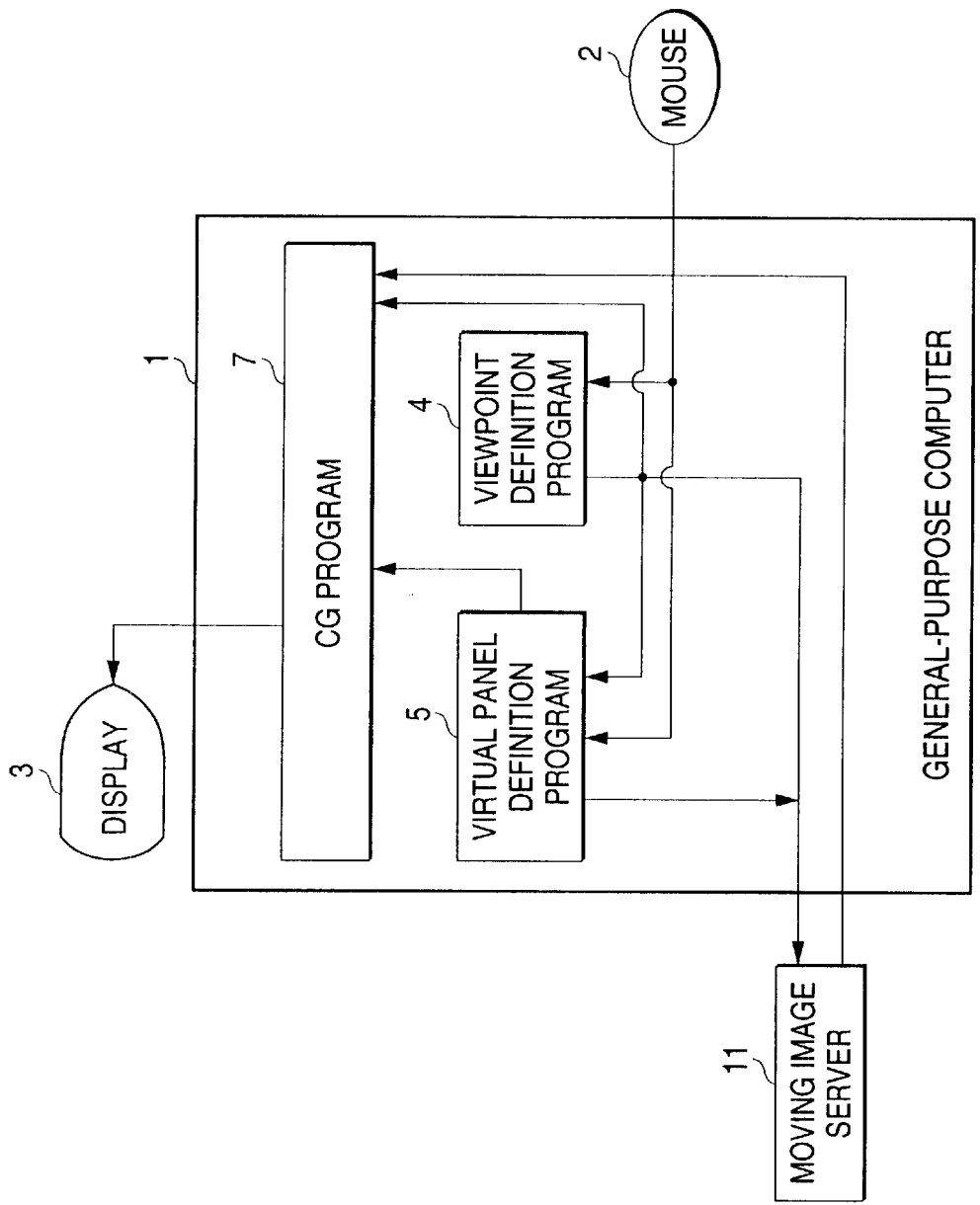
FIG. 8 is a block diagram to show the configuration of an image generation system of a sixth embodiment of the invention.

FIG. 8 is a block diagram to show the configuration of an image generation system according to the sixth embodiment of the invention. Parts identical with or similar to those previously described with reference to FIG. 1 are denoted by the same reference numerals in FIG. 8. The image generation system comprises various programs, a general-purpose computer 1 where the programs operate, peripheral machines of a mouse 2 and a display 3 connected to the general-purpose computer 1, and a moving image server 11, which corresponds to a moving image output apparatus, for distributing moving images to the general-purpose computer 1. A viewpoint definition program 4, a virtual panel definition program 5, and a CG program 7 are programs executed on the general-purpose computer 1 like those in the third embodiment.

The operation of the image generation system is as, follows: Moving images provided by photographing a photograph subject such as a human figure with a video camera from various angles are previously stored in the moving image server 11 as in the fifth embodiment described above. For example, the moving images are provided by photographing a photograph subject at 36 points at 10° intervals from 0° to 350° from the front. First, the moving image server 11 receives the position information of the virtual viewpoint in virtual three dimensions defined in the viewpoint definition program 4 of the general-purpose computer 1 and the information of the position and the orientation of the human figure object defined in the virtual panel definition program 5. Subsequently, from the information, the moving image server 11 obtains the bearing angle that the human figure object faces (orientation of the human figure object), $\phi p$, and the bearing angle of the virtual viewpoint from the reference point of the human figure object (position of the human figure object), $\phi v$, and calculates $\phi m$ from expression (1) shown in the first embodiment, then distributes the moving image corresponding to $\phi m$ to the general-purpose computer 1. On the other hand, the CG program 7 of the general-purpose computer 1 receives the distributed moving image, projects the received moving image on a virtual panel 104 in the virtual three dimensions, generates an image from the virtual viewpoint, and displays the virtual three-dimensional image on the display 3.

Here, if the operator operates the mouse 2 to change the definition of the virtual viewpoint or the human figure object, the operation signal is input to the viewpoint definition program 4 or the virtual panel definition program 5, which then changes the definition of the virtual viewpoint or the human figure object in the virtual three dimensions. Then, the moving image server 11 immediately distributes a different moving image to the general-purpose computer. The CG program 7 of the general-purpose computer 1 receives the moving image, projects the received moving image on the virtual panel 104, generates an image from the virtual viewpoint, and displays the virtual three-dimensional image on the display 3.

Thus, if the position of the virtual viewpoint or the bearing angle or the position of the human figure object in the virtual three dimensions on the general-purpose computer 1 is changed by the operator who operates the mouse 2, appropriate moving images are distributed one after another and projected on the virtual panel 104, so that the human figure object changed in view following the change in the position of the virtual viewpoint or the position or the bearing angle of the human figure object can be displayed as if an object formed of polygons were displayed.

As described above, according to the sixth embodiment of the invention, a moving image distributed from the moving image server based on the definitions of the virtual viewpoint and the human figure object on the general-purpose computer is projected onto the virtual panel defined based on the definitions of the virtual viewpoint and the human figure object and placed in the virtual three dimensions on the general-purpose computer, and an image from the virtual viewpoint is generated, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images distributed from the moving image server in the general-purpose computer, for example, because the moving image server and the general-purpose computer differ in processing speed, only one distributed moving image may be stored temporarily in the general-purpose computer and even a general-purpose computer having a small storage capacity would be able to generate an image capable of really displaying the object of a human being, an animal, a plant, etc., having curved surface portions and motion.

The definition of the virtual viewpoint, the definition of the human figure object, and/or the definition of the virtual panel is changed based on the operation signal generated through the operator's operation as in the above-described embodiment, a moving image distributed from the moving image server is again selected based on the changed definition and is projected on the virtual panel, and an image from the virtual viewpoint is generated, whereby if the position of the virtual viewpoint, the position of the human figure object, and/or the orientation of the human figure object is changed, appropriate moving images are selected one after another and the virtual three-dimensional images are generated, so that an image capable of displaying the human figure object changed in view in response to the operator's will as if a virtual object formed of polygons were displayed can be generated.

Seventh Embodiment

In the above-described embodiments, the definition of the virtual viewpoint is changed based on the operation signal of the mouse generated through the operator's operation and the virtual three-dimensional image following a move of the virtual viewpoint. Next, a seventh embodiment of the invention for limiting the move range of a viewpoint in virtual three dimensions so that an inappropriate virtual three-dimensional image is not generated if there is a restriction on the moving image projected on a virtual panel will be discussed.

Figure 9:
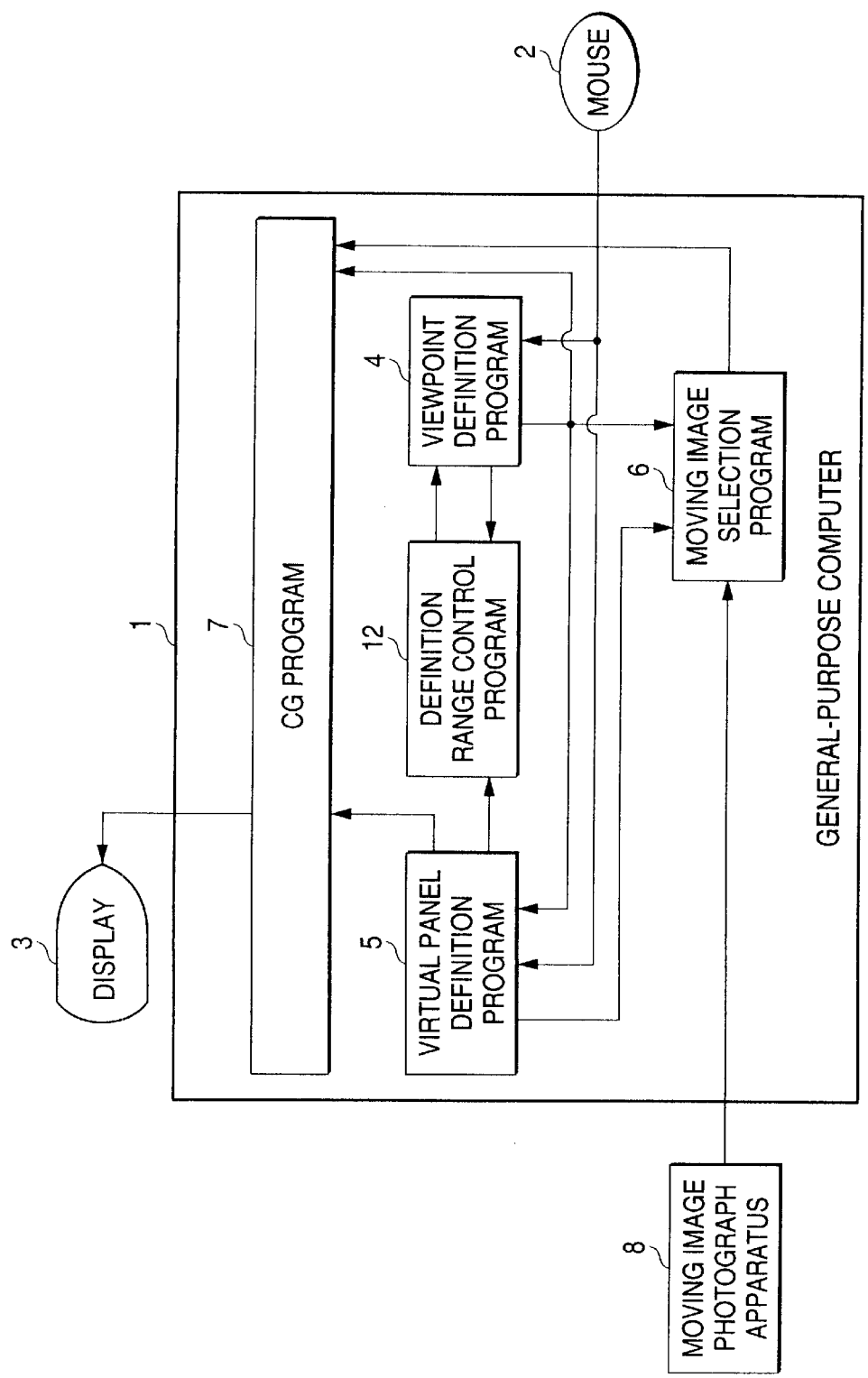
FIG. 9 is a block diagram to show the configuration of an image generation system of a seventh embodiment of the invention.

FIG. 9 is a block diagram to show the configuration of an image generation system according to the seventh embodiment of the invention. Parts identical with or similar to those previously described with reference to FIG. 1 are denoted by the same reference numerals in FIG. 9. The image generation system comprises various programs, a general-purpose computer 1 where the programs operate, peripheral machines of a mouse 2 and a display 3 connected to the general-purpose computer 1, and a moving image photograph apparatus 8. A viewpoint definition program 4, a virtual panel definition program 5, a moving image selection program 6, and a CG program 7 are programs executed on the general-purpose computer 1 like those in the first embodiment.

Numeral 12 denotes a definition range control program for controlling the definition range of the viewpoint definition program 4 in response to the type of moving image found based on the definitions of a virtual viewpoint and a human figure object and the previously entered type of moving image output from the moving image photograph apparatus 8 when the definition of the virtual viewpoint in the viewpoint definition program 4 is changed. The definition range control program 12 corresponds to definition range control means for controlling the definition range of viewpoint definition means or virtual panel definition means in response to the previously entered type of moving image output from the moving image output apparatus.

In the seventh embodiment, parts other than the definition range control program 12 are configured as in FIG. 3 like those in the first embodiment. However, for convenience, the height of each virtual viewpoint in virtual three dimensions is constant and is set to the height corresponding to the stature of a photograph subject. In the moving image photograph apparatus 8 in FIG. 3, only 19 video cameras from 270° to 350° and from 0° to 90° are placed. That is, only the front of the photograph subject is photographed. Information on the placement of the video cameras is previously entered in the definition range control program 12 as the type of moving image output from the moving image photograph apparatus 8.

The operation of the image generation system is as follows: Assume that in the state in FIG. 3, the operator attempts to change the bearing angle of the virtual viewpoint from the reference point of a human figure object (position of the human figure object), $\phi v$, for example, from 11° to 300° by operating the mouse 2. Then, the operation signal is input to the viewpoint definition program 4, which then finds the definition of the virtual viewpoint responsive to the operation signal. When the definition of the virtual viewpoint is found, the definition range control program 12 finds $\phi m$ based on expression (1) in the first embodiment described above. Here, $\phi v$ is 300° and $\phi p$ is 43°, so that $\phi m$ is calculated as 260°.

Subsequently, the definition range control program 12 compares $\phi m = 260°$ found above with the previously entered type of moving image output from the moving image photograph apparatus 8, namely, the position of the video camera photographing the photograph subject. However, no video camera is placed at the direction of 260° and therefore the definition range control program 12 outputs an invalid signal for the definition of the virtual viewpoint found by the viewpoint definition program 4 thereto. Then, the viewpoint definition program 4 invalidates the operation signal of the mouse 2 and does not change the definition of the virtual viewpoint based on the operation signal.

On the other hand, if one of the video cameras is placed in the direction of $\phi m$ found, the definition range control program 12 outputs a valid signal for the definition of the virtual viewpoint found by the viewpoint definition program 4 thereto. Then, the viewpoint definition program 4 validates the operation signal of the mouse 2 and changes the definition of the virtual viewpoint based on the operation signal.

Thus, if no video camera exists in the direction of $\phi m$ calculated, the operation of the mouse 2 can be invalidated so that an inappropriate virtual three-dimensional image is not generated.

For example, in the moving image photograph apparatus 8 illustrated in FIG. 3, the video cameras are placed on the circumference of a circle horizontal to the floor with the photograph subject as the center, thus a moving image from just above or below the photograph subject cannot be provided. Therefore, if the virtual viewpoint in the virtual three dimensions is moved to just above or below a human figure object, it is impossible to generate a correct virtual three-dimensional image as a view. On the other hand, it is found out by experiment that an appropriate image can be generated if the height of the virtual viewpoint from the XZ plane corresponding to the floor in the virtual three dimensions is in the range of 50% to 150% relative to the height of the video camera photographing the photograph subject from the floor.

Thus, the image photograph apparatus of the image output apparatus can output some moving images and cannot output some; when the virtual viewpoint in the virtual three dimensions is moved, the move range of the virtual viewpoint can be limited so that an inappropriate virtual three-dimensional image is not generated.

As described above, according to the seventh embodiment of the invention, when the definition of the virtual viewpoint in the viewpoint definition program is changed, the moving image type found based on the definitions of the virtual viewpoint and the human figure object is compared with the type of moving image output from the moving image photograph apparatus, previously entered in the definition range control program 12. If the moving image type found is not involved in the type of moving image output from the moving image photograph apparatus, changing the definition of the virtual viewpoint is invalidated and if the moving image type found is involved in the type of moving image output from the moving image photograph apparatus, changing the definition of the virtual viewpoint is validated for controlling the definition range of the viewpoint definition program, whereby if there is a restriction on the moving image projected onto the virtual panel, the move range of the virtual viewpoint in the virtual three dimensions can be limited, so that an inappropriate virtual three-dimensional image can be prevented from being generated.

Eighth Embodiment

In the described seventh embodiment, if there is a restriction on the moving image projected onto the virtual panel, the move range of the virtual viewpoint in the virtual three dimensions is limited so that an inappropriate virtual three-dimensional image is not generated. Next, an eighth embodiment of the invention for limiting the definition of a human figure object in virtual three dimensions will be discussed.

Figure 10:
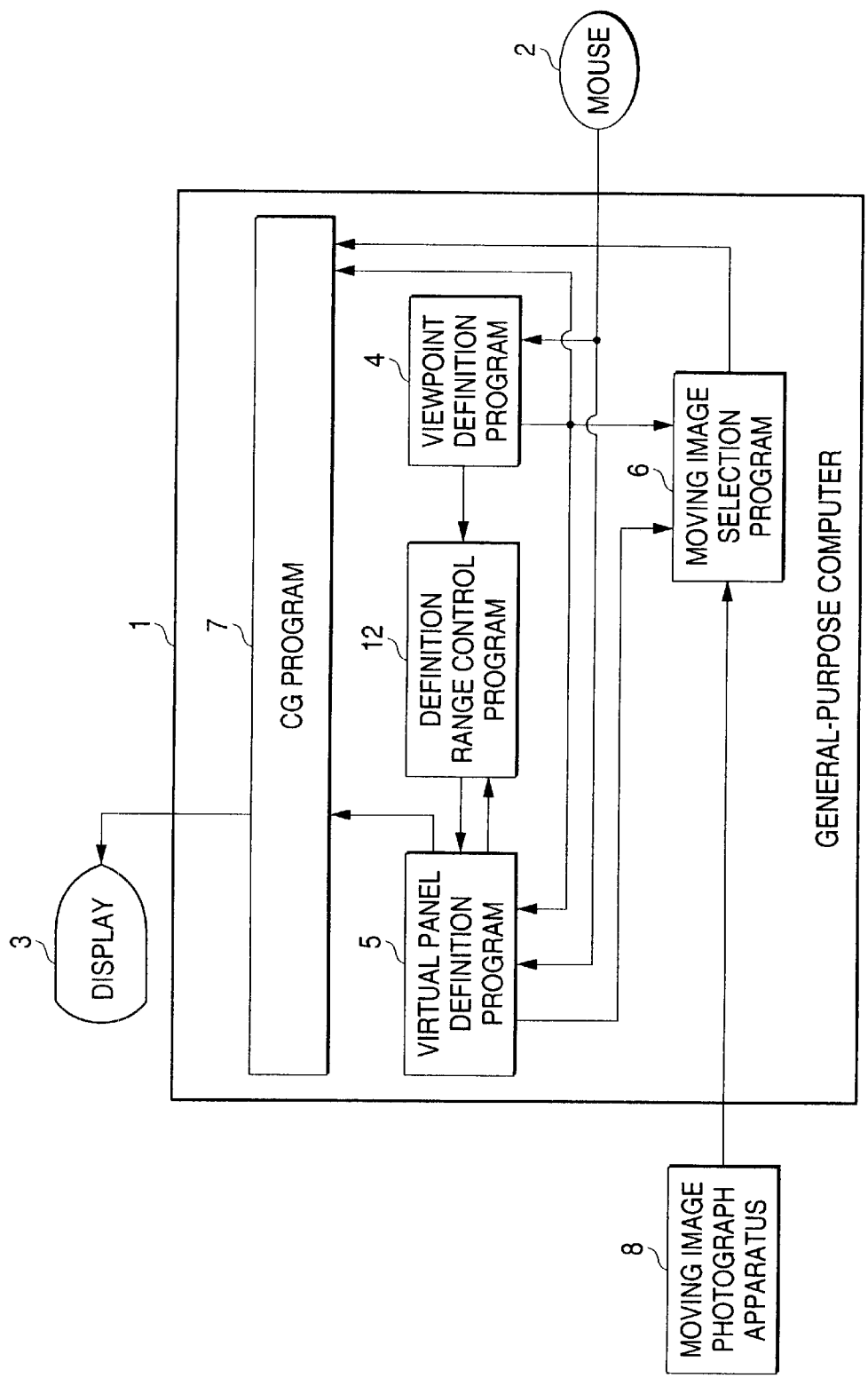
FIG. 10 is a block diagram to show the configuration of an image generation system of an eighth embodiment of the invention.

FIG. 10 is a block diagram to show the configuration of an image generation system according to the eighth embodiment of the invention. Parts identical with or similar to those previously described with reference to FIG. 1 are denoted by the same reference numerals in FIG. 10. The image generation system comprises various programs, a general-purpose computer 1 where the programs operate, peripheral machines of a mouse 2 and a display 3 connected to the general-purpose computer 1, and a moving image photograph apparatus 8. A viewpoint definition program 4, a virtual panel definition program 5, a moving image selection program 6, and a CG program 7 are programs executed on the general-purpose computer like those in the seventh embodiment.

However, a definition range control program 12 controls the definition range of the virtual panel definition program 5 in response to the type of moving image found based on the definitions of a virtual viewpoint and a human figure object and the previously entered type of moving image output from the moving image photograph apparatus 8 when the definition of the human figure object in the virtual panel definition program 5 is changed. The definition range control program 12 corresponds to definition range control means for controlling the definition range of viewpoint definition means or virtual panel definition means in response to the previously entered type of moving image output from the moving image output apparatus.

In the eighth embodiment like the above-described seventh embodiment, parts other than the definition range control program 12 are also configured as in FIG. 3 like those in the first embodiment. However, for convenience, the height of each virtual viewpoint in virtual three dimensions is constant and is set to the height corresponding to the stature of a photograph subject. In the moving image photograph apparatus 8 in FIG. 3, only 19 video cameras from 270° to 350° and from 0° to 90° are placed. That is, only the front of the photograph subject is photographed. Information on the placement of the video cameras is previously entered in the definition range control program 12 as the type of moving image output from the moving image photograph apparatus 8.

The operation of the image generation system is as follows: Assume that in the state in FIG. 3, the operator attempts to change the bearing angle that the human figure object faces (orientation of the human figure object), φp, by operating the mouse 2. Then, the operation signal is input to the virtual panel definition program 5, which then finds the definition of the human figure object responsive to the operation signal. When the definition of the human figure object is found, the definition range control program 12 finds φm based on expression (1) in the first embodiment described above.

Subsequently, the definition range control program 12 compares φm found above with the previously entered type of moving image output from the moving image photograph apparatus 8, namely, the position of the video camera photographing the photograph subject. As the comparison result, if no video camera is placed at the direction of φm found above, the definition range control program 12 outputs an invalid signal for the definition of the human figure object found by the virtual panel definition program 5 thereto. Then, the virtual panel definition program 5 invalidates the operation signal of the mouse 2 and does not change the definition of the human figure object based on the operation signal.

On the other hand, if one of the video cameras is placed in the direction of φm found, the definition range control program 12 outputs a valid signal for the definition of the human figure object found by the virtual panel definition program 5 thereto. Then, the virtual panel definition program 5 validates the operation signal of the mouse 2 and changes the definition of the human figure object based on the operation signal.

Thus, if no video camera exists in the direction of φm calculated, the operation of the mouse 2 can be invalidated so that an inappropriate virtual three-dimensional image is not generated.

As described above, according to the eighth embodiment of the invention, when the definition of the human figure object in the virtual panel definition program is changed, the moving image type found based on the definitions of the virtual viewpoint and the human figure object is compared with the type of moving image output from the moving image photograph apparatus, previously entered in the definition range control program 12. If the moving image type found is not involved in the type of moving image output from the moving image photograph apparatus, changing the definition of the human figure object is invalidated and if the moving image type found is involved in the type of moving image output from the moving image photograph apparatus, changing the definition of the human figure object is validated for controlling the definition range of the viewpoint definition program, whereby if there is a restriction on the moving image projected onto the virtual panel, the move range of the human figure object in the virtual three dimensions can be limited, so that an inappropriate virtual three-dimensional image can be prevented from being generated.

Ninth Embodiment

In the description of the embodiments, a moving image is projected onto the virtual panel placed in the virtual three dimensions. Next, a ninth embodiment of the invention using a high-performance computer for generating a moving image based on information of a virtual viewpoint and a virtual object as a moving image output apparatus to combine an image in virtual three dimensions and a moving image output from the moving image output apparatus will be discussed.

Figure 12:
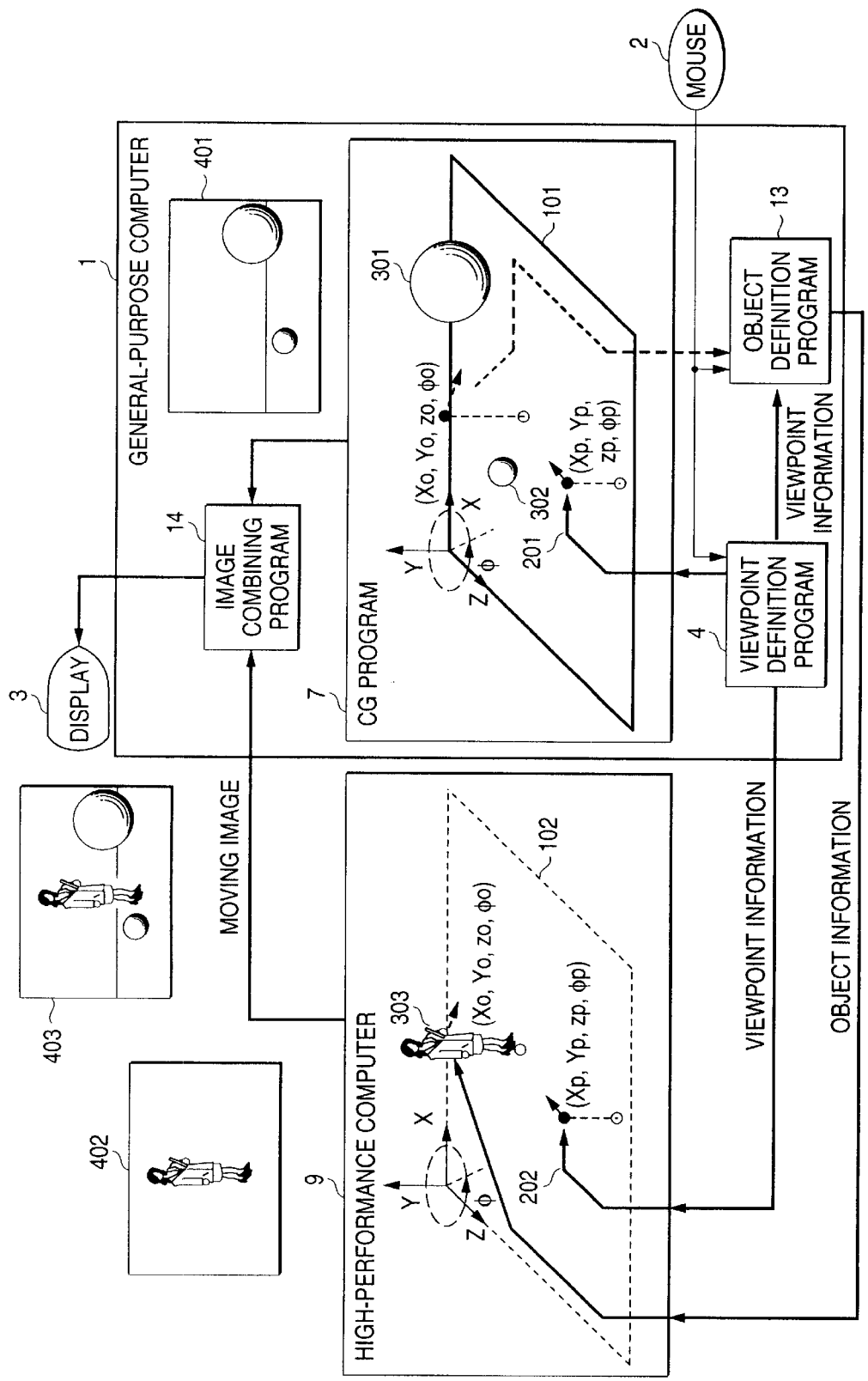
FIG. 12 is a block diagram to show the configuration of an image generation system of a ninth embodiment of the invention.

FIG. 12 is a block diagram to show the configuration of an image generation system according to the ninth embodiment of the invention. Parts identical with or similar to those previously described with reference to FIG. 1 are denoted by the same reference numerals in FIG. 12. The image generation system comprises various programs, a general-purpose computer 1 where the programs operate, peripheral machines of a mouse 2 and a display 3, and a high-performance computer 9 that can generate a moving image of a virtual object made up of a large number of polygons at high speed as compared with general-purpose computer. The high-performance computer 9 corresponds to a moving image output apparatus. A viewpoint definition program 4 corresponds to viewpoint definition means, a CG program 7 corresponds to virtual three-dimensional image generation means, an object definition program 13 corresponds to object definition means for defining a virtual object displayed in virtual three dimensions, and an image combining program 14 corresponds to image combining means for generating a composite image into which an image generated in the CG program 7 and a moving image output from the high-performance computer 9 are combined; the programs are programs executed on the general-purpose computer 1.

As described in [Related Art], about several hundreds of thousands of polygons are necessary for really displaying a human figure, etc., using polygons in virtual three dimensions. The high-performance computer 9 is a computer capable of generating an image of a virtual object made up of a large number of polygons at high speed. For example, a high-ranked graphics workstation of Silicon Graphics USA is applied.

The operation of the image generation system is as follows: Here, a method of generating a virtual three-dimensional image containing a polygon model of a human FIG. formed of about several hundreds of thousands of polygons and given motion on the general-purpose computer using the high-performance computer will be discussed. In the description that follows, the polygon model of a human figure mentioned above will be called human figure object and other polygon models will be called CG objects.

Virtual three dimensions 101 are defined on the general-purpose computer 1 and a virtual viewpoint 201 is placed in the virtual three dimensions 101 based on the position and the orientation, which are the definition contents of the viewpoint definition program 4. CG objects 301 and 302 are also placed in the virtual three dimensions 101.

On the other hand, virtual three dimensions 102 are defined on the high-performance computer 9. The high-performance computer 9 receives information of the position and the orientation of a human figure object from the object definition program 13 and places a human figure object 303 in the virtual three dimensions 102 based on the received information. At this time, data of polygons defining the human figure object 303 is already stored in the high-performance computer 9.

Subsequently, the high-performance computer 9 receives information of the position and the orientation of a virtual viewpoint from the viewpoint definition program 4 and places a virtual viewpoint 202 in the virtual three dimensions 102 based on the received information, then generates a moving image 402 of the human figure object from the virtual viewpoint.

The moving image 402 generated by the high-performance computer 9 is sent to the image combining program 14 and is combined with a virtual three-dimensional image 401 generated by the CG program 7 for displaying a composite image 403 on the display 403. Several methods of combining the moving image 402 and the image 401 are available. For example, in the moving image 402, all pixels other than the pixels of the portion corresponding to the human figure object 303 are colored in blue and pixels other than the blue pixels in the moving image 402 are written over the image 401 in the image combining program 14, whereby the composite image 403 can be provided. This method is called chromakey.

Another method is a method using a distance from a virtual viewpoint given to each pixel of a moving image, called a depth value. For example, assume that in the moving image 402, the depth values of the pixels of the portion corresponding to the human figure object 303 are set in the range of 0.0 to 0.4 and the depth values of other pixels are set to 1.0. Also, assume that in the image 401, the depth values of all pixels are set in the range of 0.5 to 0.9. Next, if the image 401 and the moving image 402 are superposed on each other in the image combining program 14 and the pixel having a larger depth value is taken out for each pixel to again form an image, the composite image 403 can be provided.

Here, if the operator operates the mouse 2, the operation signal is input to the viewpoint definition program 4 or the virtual panel definition program 5, which then changes the definition of the virtual viewpoint or the human figure object. Then, the high-performance computer 9 immediately again places the virtual viewpoint or the human figure object in the virtual three dimensions on the high-performance computer 9 and generates a different moving image 401 of the polygon model of the human figure. The image combining program 14 of the general-purpose computer 1 receives the moving image 401, combines the received moving image with the virtual three-dimensional image 401 generated by the CG program 7, and displays the composite image 402 on the display 3.

Thus, if the position of the virtual viewpoint or the bearing angle or the position of the human figure object in the virtual three dimensions on the general-purpose computer 1 is changed by the operator who operates the mouse 2, appropriate moving images are generated one after another and sent to the image combining program 14, so that the virtual three-dimensional image containing the human figure object changed in view following the change in the position or the direction of the virtual viewpoint 201 or the position or the bearing angle of the human figure object can be displayed as if a virtual object placed in the virtual three dimensions 101 on the general-purpose computer 1 were displayed.

As described above, according to the ninth embodiment of the invention, a moving image of the polygon model of the human figure having motion generated in the high-performance computer based on the definitions of the virtual viewpoint and the human figure object on the general-purpose computer is combined with the virtual three-dimensional image generated on the general-purpose computer, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images generated in the high-performance computer in the general-purpose computer, for example, because the high-performance computer and the general-purpose computer differ in processing speed, only one moving image may be stored temporarily and even a general-purpose computer having a small storage capacity would be able to generate an image capable of really displaying the object of a human being, an animal, a plant, etc., having curved surface portions and motion.

The definition of the virtual viewpoint or the definition of the human figure object can be changed based on the operation signal generated through the operator's operation and the moving image generated in the high-performance computer is combined with the virtual three-dimensional image generated in the general-purpose computer based on the changed definition, whereby if the position or the orientation of the virtual viewpoint or the position or the orientation of the human figure object is changed, appropriate moving images are generated one after another and are combined with the virtual three-dimensional images into composite images, so that an image capable of displaying the human figure object changed in view in response to the operator's will as if a virtual object placed in the virtual three dimensions on the general-purpose computer were displayed can be generated.

Tenth Embodiment

In the described ninth embodiment, the method of using the high-performance computer as the moving image output apparatus has been described. Next, a tenth embodiment of the invention using a three-dimensional graphics board installed in a general-purpose computer as moving image output apparatus will be discussed.

Figure 13:
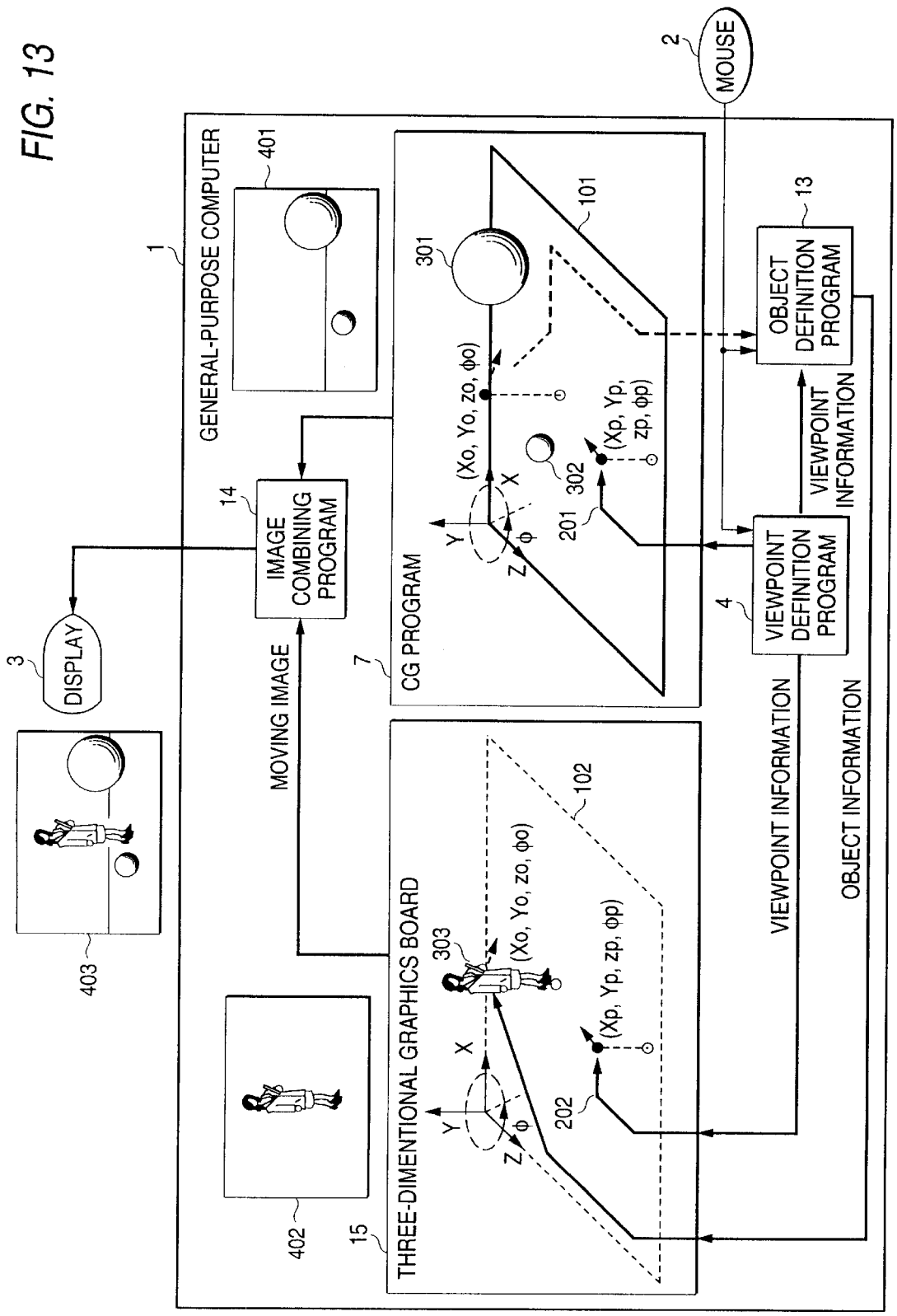
FIG. 13 is a block diagram to show the configuration of an image generation system of a tenth embodiment of the invention.

FIG. 13 is a block diagram to show the configuration of an image generation system according to the tenth embodiment of the invention. The image generation system comprises various programs, a general-purpose computer 1 where the programs operate, peripheral machines of a mouse 2 and a display 3, and a three-dimensional graphics board 15 which is installed in the general-purpose computer 1 and can generate a moving image of a virtual object made up of polygons exceeding several tens of thousands of polygons at high speed. The three-dimensional graphics board 15 corresponds to a moving image output apparatus. A viewpoint definition program 4 corresponds to viewpoint definition means, a CG program 7 corresponds to virtual three-dimensional image generation means, an object definition program 13 corresponds to object definition means, and an image combining program 14 corresponds to image combining means; the programs are programs executed on the general-purpose computer 1.

As described in [Related Art], about several hundreds of thousands of polygons are necessary for really displaying a human figure, etc., using polygons in virtual three dimensions, and a computer having a high computation capability is required. A technique, called volume molding, of representing an object as a cluster of minute cubes called voxels is available. Drawing of computer graphics based on the volume molding requires a computer having a higher computation capability. A product named VolumePro manufactured by Mitubishi Denki is available as an example of the three-dimensional graphics board for drawing computer graphics based on the volume molding at high speed.

In the tenth embodiment of the invention, a method of generating a virtual three-dimensional image containing a voxel model of a human figure formed of more than several millions of voxels and given motion on the general-purpose computer using the three-dimensional graphics board will be discussed. In the description that follows, the voxel model of a human figure mentioned above will be called human figure object and other voxel models will be called CG objects.

Virtual three dimensions 101 are defined on the general-purpose computer 1 and a virtual viewpoint 201 is placed in the virtual three dimensions 101 based on the position and the orientation, which are the definition contents of the viewpoint definition program 4. CG objects 301 and 302 are also placed in the virtual three dimensions 101.

On the other hand, virtual three dimensions 102 are defined on the three-dimensional graphics board 15. The three-dimensional graphics board 15 receives information of the position and the orientation of a human figure object from the object definition program 13 and places a human figure object 303 in the virtual three dimensions 102 based on the received information. At this time, data of voxels defining the human figure object 303 is already stored in the three-dimensional graphics board or main memory of the general-purpose computer 1.

Subsequently, the three-dimensional graphics board 15 receives information of the position and the orientation of a virtual viewpoint from the viewpoint definition program 4 and places a virtual viewpoint 202 in the virtual three dimensions 102 based on the received information, then generates a moving image 402 of the human figure object from the virtual viewpoint.

The moving image 402 generated by the three-dimensional graphics board 15 is sent to the image combining program 14 and is combined with a virtual three-dimensional image 401 generated by the CG program 7 for displaying a composite image 403 on the display 403. The method of combining the moving image 402 and the image 401 is similar to that in the ninth embodiment.

The operation performed if the operator operates the mouse 2 to change the definition of the virtual viewpoint or the human figure object is also similar to that in the ninth embodiment.

As described above, according to the tenth embodiment of the invention, a moving image of the voxel model of the human figure having motion generated in the three-dimensional graphics board based on the definitions of the virtual viewpoint and the human figure object on the general-purpose computer is combined with the virtual three-dimensional image generated on the CG program, whereby the virtual three-dimensional image can be generated without storing any moving image in the general-purpose computer. Thus, even a general-purpose computer having a small storage capacity would be able to generate an image capable of really displaying the object of a human being, an animal, a plant, etc., having curved surface portions and motion. To temporarily store moving images generated in the three-dimensional graphics board in the general-purpose computer, for example, because the three-dimensional graphics board and the CG program differ in processing speed, only one moving image may be stored temporarily and even a general-purpose computer having a small storage capacity would be able to generate an image capable of really displaying the object of a human being, an animal, a plant, etc., having curved surface portions and motion.

The definition of the virtual viewpoint or the definition of the human figure object can be changed based on the operation signal generated through the operator's operation and the moving image generated in the three-dimensional graphics board is combined with the virtual three-dimensional image generated in the CG program based on the changed definition, whereby if the position or the orientation of the virtual viewpoint or the position or the orientation of the human figure object is changed, appropriate moving images are generated one after another and are combined with the virtual three-dimensional images into composite images, so that an image capable of displaying the human figure object changed in view in response to the operator's will as if a virtual object placed in the virtual three dimensions on the CG program were displayed can be generated.

The modifications of the above-described embodiments will be discussed.

Eleventh Embodiment

In the above-described embodiments, the virtual panel is one rectangular polygon, but may be of any other shape or may be provided by combining two or more polygons. For example, the virtual panel may be made elliptical for applying a three-dimensional appearance to the virtual panel.

Twelfth Embodiment

Figure 11:
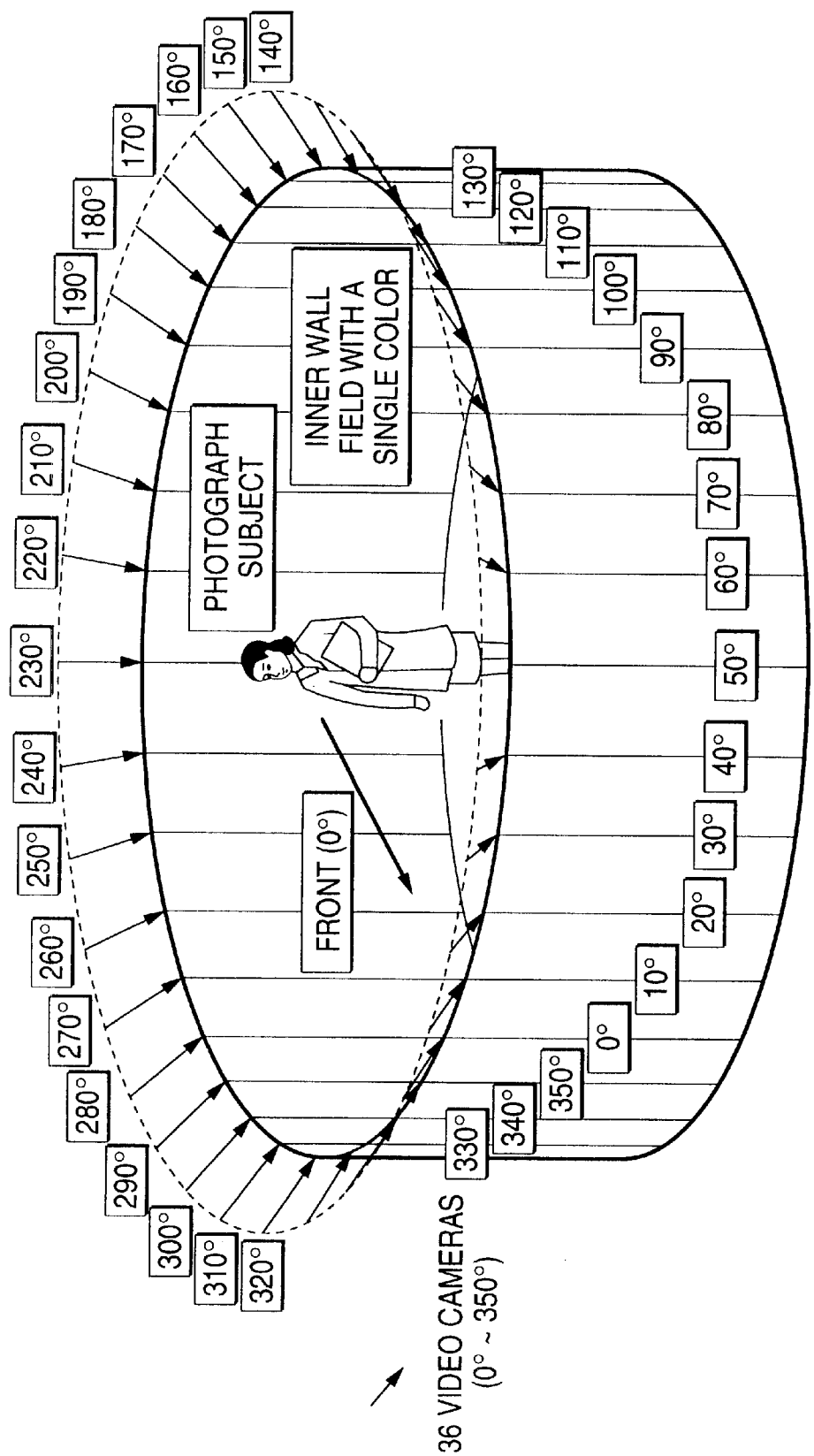
FIG. 11 is a block diagram to show an example of a moving image photograph apparatus.

In the above-described embodiments, the moving image photograph apparatus 8 in FIG. 3 photographs a subject through a small hole made in the wall, but may photograph a subject in another way. For example, the subject may be photographed from above the subject, as shown in FIG. 11.

Thirteenth Embodiment

In the above-described embodiments, by way of example, only one virtual panel is placed in the virtual three dimensions, but more than one virtual panels may be placed for displaying a plurality of human figure objects.

Fourteenth Embodiment

In the above-described embodiments, by way of example, the moving image projected onto the virtual panel is the moving image of a human figure object, but may be the moving image of any other object than a human figure object, such as an animal or a moving machine. The image projected onto the virtual panel may be a still image of a flower vase, a room, etc., rather than a moving image.

Fifteenth Embodiment

In the description of the above-described embodiments, one general-purpose computer of the image generation apparatus is connected to the moving image photograph apparatus, the high-performance computer, the movable moving image photograph apparatus, or the moving image server of the moving image output apparatus, but two or more general-purpose computers may be connected thereto. In contrast, more than one moving image photograph apparatus, more than one high-performance computer, more than one movable moving image photograph apparatus, or more than one moving image server may be connected to one general-purpose computer.

Sixteenth Embodiment

In the above-described embodiments, one or more virtual panels may be placed in the virtual three dimensions on the general-purpose computer of the image generation apparatus and the moving image projected onto each virtual panel may be received from one or more moving image photograph apparatus, one or more high-performance computers, one or more movable moving image photograph apparatus, or one or more moving image servers of one or more moving image output apparatus.

Seventeenth Embodiment

In the description of the above-described embodiments, the moving image projected onto the virtual panel is an actual image photographed with the video camera or a moving image generated in the high-performance computer from a polygon model of real-time CG; it may be any other moving image, such as cell animation.

Eighteenth Embodiment

In the above-described embodiments, by way of example, in the moving image photograph apparatus and the movable moving image photograph apparatus of the moving image output apparatus, the video cameras are placed on the circumference of a circle horizontal to the floor with the photograph subject as the center, but may be placed in any other way. For example, the video cameras may be placed on the circumference of a circle perpendicular to the floor or may be placed at the changed distance from the photograph subject. The video cameras are placed at 10° intervals, but may be placed at other intervals. The video cameras may be placed at proper intervals inside a hemisphere or a sphere with the photograph subject as the center. Likewise, the virtual viewpoint in the virtual three-dimensions on the high-performance computer may be placed in any other way than that in the above-described embodiments. Also in the moving image server, the virtual viewpoint may be placed in any other way than that in the above-described embodiments.

Nineteenth Embodiment

In the description of the above-described embodiments, the definition of the virtual viewpoint or the definition of the human figure object is changed based on the operation signal generated through the operator's operation, but the invention is not limited to it. For example, the viewpoint definition program of the viewpoint definition means may change the definition of the virtual viewpoint to the position moved a predetermine d distance in the X axis direction every predetermined time. For example, the virtual panel definition program of the virtual panel definition means may change the definition of the position of the human figure object to the position moved a predetermined distance in the Z axis direction every predetermined time and may change the definition of the orientation of the human figure object to the orientation rotated counterclockwise at a predetermined angle every predetermined time.

Twentieth Embodiment

In the description of the above-described embodiments, the moving image selection program of the moving image selection means selects a moving image based on the definition of the virtual viewpoint and the definition of the human figure object, but the invention is not limited to it. For example, if the position and the orientation of the human figure object are fixed, a moving image may be selected based only on the definition of the virtual viewpoint. For example, assume that the reference point of the human figure object is fixed to the origin (0, 0, 0) and is upright perpendicularly to the X-Z plane and that the orientation of the human figure object is fixed to the Z axis direction. In this case, $\phi p$ is always 0° and $\phi v$ becomes the bearing angle of the viewpoint viewed from the origin in the above-described expression (1), thus if the coordinates of the virtual viewpoint are (X, Z), the moving image selection program selects a moving image based on the following expression (3):

$$\phi m = \text{int}((\text{mod}(360 + a\tan(X/Z), 360) + 5)/10) * 10 \tag{3}$$

where atan denotes arc tangent.

Twenty-first Embodiment

In the description of the above-described embodiments, the moving image output apparatus such as the high-performance computer shown in FIG. 5, the movable moving image photograph apparatus shown in FIG. 6, or the moving image server shown in FIG. 8 outputs an image based on the definition of the virtual viewpoint and the definition of the human figure object, but the invention is not limited to it. For example, if the position and the orientation of the human figure object are fixed, a moving image is output based only on the definition of the virtual viewpoint.

Twenty-second Embodiment

In the above-described embodiments, the moving image photograph apparatus or the movable moving image photograph apparatus of the moving image output apparatus may be configured so as to output two types of moving images provided by photographing a moving image for a right eye and that for a left eye separately, the general-purpose computer of the image generation apparatus may be configured so as to use the two types of moving images for right and left eyes to generate two types of virtual three-dimensional images for right and left eyes, and the display may be configured so as to produce display so that the virtual three-dimensional image for the right eye is visible with a right eye and the virtual three-dimensional image for the left eye is visible with a left eye at the same time, whereby a three-dimensional appearance can be given to the moving image projected onto the virtual panel.

For example, two video cameras are placed about 8 cm (corresponding to the distance between human being's eyeballs) apart left and right and photograph the same subject at the same time, whereby the moving image photograph apparatus or the movable moving image photograph apparatus of the moving image output apparatus photographs and outputs the moving image for a right eye and the moving image for a left eye separately.

Two general-purpose computers of image generation apparatus are provided and one is assigned processing of generating a virtual three-dimensional image for a right eye and the other is assigned processing of generating a virtual three-dimensional image for a left eye. Here, one mouse is connected to the two general-purpose computers so that a virtual viewpoint and a human figure object can be operated in the same way. The two general-purpose computers operate like those in the above-described embodiments. The general-purpose computer for a right eye projects the moving image for the right eye onto the virtual panel and generates an image and the general-purpose computer for a left eye projects the moving image for the left eye onto the virtual panel and generates an image.

In the high-performance computer and the moving image server of the moving image output apparatus, similar modifications may be made; similar advantages can be provided.

Twenty-third Embodiment

In the above-described embodiments, the computer for executing the CG program of the virtual three-dimensional image generation means is a general-purpose computer, but may be a high-performance computer such as a graphics workstation. The method of inputting moving images to the general-purpose computer may be any method such as a method using a dedicated cable, a method using a local area network of Ethernet, etc., or a wide-area network of ISDN or the Internet if moving images can be input to the general-purpose computer.

Twenty-fourth Embodiment

In the above-described embodiments, the calculation expressions for selecting a moving image in the moving image selection program, the high-performance computer, the movable moving image photograph apparatus, the moving image server are shown by way of example, but any other calculation expression may be used if any one can be selected from among a plurality of moving images.

Twenty-fifth Embodiment

In the above-described embodiments, the virtual panel in the virtual three dimensions is placed so as to be perpendicular to the XZ plane corresponding to the floor and face the front relative to the viewpoint, but may be placed in any other way. For example, the virtual panel may be placed so as to always become perpendicular to the line extended from the viewpoint to the virtual panel independently of the plane corresponding to the floor.

Twenty-sixth Embodiment

In the above-described embodiments, if the moving image type found based on the definitions of the virtual viewpoint and the human figure object is not involved in the previously entered type of moving image output from the moving image photograph apparatus, the definition range control program of the definition range control means invalidates the operation of the mouse, thereby avoiding generation of an inappropriate image, but generation of an inappropriate image may be avoided by any other method. For example, the definition of the virtual viewpoint or the human figure object corresponding to the moving image closest to the moving image found based on the definitions of the virtual viewpoint and the human figure object may be output to the viewpoint definition program or the virtual panel definition program.

Twenty-seventh Embodiment

In the above-described embodiments, the definition range control program of the definition range control means controls the definition range in response to the moving image type found based on the definitions of the virtual viewpoint and the human figure object and the previously entered type of moving image; if the moving image output apparatus or the moving image selection means outputs or selects a moving image based only on the definition of the virtual viewpoint, the definition range control program controls the definition range in response to the moving image type found based on the definition of the virtual viewpoint and the previously entered type of moving image.

Twenty-eighth Embodiment

In the above-described embodiments, the type of moving image output from the moving image photograph apparatus of the moving image output apparatus is previously entered in the definition range control program of the definition range control means. For example, if the moving image output apparatus is a high-performance computer as described in the second or third embodiment, the type of moving image generated in the high-performance computer is previously entered in the definition range control program. For example, if the moving image output apparatus is a movable moving image photograph apparatus as described in the fourth embodiment, the type of moving image photographed in the movable moving image photograph apparatus is previously entered in the definition range control program. For example, if the moving image output apparatus is a moving image server as described in the second or third embodiment, the type of moving image distributed in the moving image server is previously entered in the definition range control program.

Twenty-ninth Embodiment

In the description of the above-described embodiments, the definition range control program of the definition range control means is an independent component, but may be contained in the viewpoint definition program of the viewpoint definition means. In this case, the viewpoint definition program receives the information of the definition of the human figure object from the virtual panel definition program. The definition range control program may be contained in the virtual panel definition program of the virtual panel definition means. It may also be contained in the moving image selection program of the moving image selection means. Further, the definition range control program may be contained in the moving image output apparatus such as the high-performance computer shown in FIG. 5, the movable moving image photograph apparatus shown in FIG. 6, or the moving image server shown in FIG. 8.

Thirtieth Embodiment

In the ninth embodiment, the human figure object 303 and the virtual viewpoint 202 are placed in the virtual three dimensions 102 on the high-performance computer 9 based on the positions and the directions defined in the object definition program 13 and the viewpoint definition program 4, but may be placed so that the relative position and direction relationships between the human figure object 303 and the virtual viewpoint 202 are held with the human figure object 303 or the virtual viewpoint 202 fixed. A position example is given. When the coordinates of the reference point of the human figure object are the origin (0, 0, 0) and the coordinates of the virtual viewpoint defined in the viewpoint definition program 4 are (−20, 10, 150) and the coordinates of the human figure object defined in the object definition program 13 are (30, 20, 60), the virtual viewpoint 202 may be placed in the coordinates of (−20−30, 10−20, 150−60)=(−50, −10, 90). In the tenth embodiment, a similar modification can also be made when the human figure object 303 and the virtual viewpoint 202 are placed in the virtual three dimensions 102 on the three-dimensional graphics board 10.

Thirty-first Embodiment

In the ninth and tenth embodiments, the virtual three-dimensional image generation means is the CG program, but may be hardware such as a three-dimensional graphics board of the type wherein it is installed in a computer. For example, in FIG. 13, two three-dimensional graphics boards may be inserted into the general-purpose computer 1 with one used as the virtual three-dimensional image generation means and the other as the moving image generation apparatus.

Thirty-second Embodiment

In the ninth and tenth embodiments, the viewpoint definition means, the object definition means, the image combining means, and the virtual three-dimensional image generation means are implemented as software of the viewpoint definition program, the object definition program, the image combining program, and the CG program respectively, but all or some of them may be implemented as hardware for performing the same operation as the software.

Thirty-third Embodiment

In FIG. 12 (the ninth embodiment) and FIG. 13 (the tenth embodiment), counterclockwise direction $\phi$ on the X-Z plane with the plus direction of the Z axis as the reference (yaw angle as a general term) is given as the information indicating the orientations of the human figure object and the virtual viewpoint. In addition, a pitch angle, a roll angle, etc., may be given. Likewise, although the three-dimensional rectangular coordinates (X-Y-Z) are used as the information indicating the position, any other coordinate system, such as a spherical coordinate system, may be used.

As described above, the image generation system according to one aspect of the invention comprises an image generation apparatus having viewpoint definition means for defining a virtual viewpoint placed in virtual three dimensions, virtual panel definition means for defining a virtual object displayed in the virtual three dimensions and defining a virtual panel being placed in the virtual three dimensions, the virtual panel onto which a moving image is projected, based on the virtual viewpoint and the virtual object, moving image selection means for selecting a moving image to be projected onto the virtual panel from among a plurality of moving images based on the virtual viewpoint defined in the viewpoint definition means, and virtual three-dimensional image generation means for placing the virtual panel defined in the virtual panel definition means in the virtual three dimensions, projecting the moving image selected by the moving image selection means onto the virtual panel, and generating an image from the virtual viewpoint defined in the viewpoint definition means, and a moving image output apparatus for outputting the plurality of moving images to the image generation apparatus. Thus, the virtual three-dimensional image can be generated without storing any moving image in the general-purpose computer, so that even a general-purpose computer having a small storage capacity would be able to generate an image capable of really displaying the object of a human being, an animal, a plant, etc., having curved surface portions and motion. To temporarily store moving images output from the moving image output apparatus in the image generation apparatus, for example, because the moving image output apparatus and the image generation apparatus differ in processing speed, only selected one of a plurality of moving images may be stored temporarily and even a general-purpose computer having a small storage capacity would be able to generate an image capable of really displaying the object of a human being, an animal, a plant, etc., having curved surface portions and motion. This is an advantage of the invention.

According to the image generation system of the invention, the moving image selection means selects the moving image to be projected onto the virtual panel from among a plurality of moving images based on the virtual viewpoint defined in the viewpoint definition means and the virtual object defined in the virtual panel definition means. Thus, the moving image responsive to the definitions of the virtual viewpoint and the virtual object is selected and the virtual three-dimensional image is generated, so that an image capable of displaying the virtual object changed in view in response to the definitions of the virtual viewpoint and the virtual object can be generated. This is an advantage of the invention.

The image generation system according to another aspect of the invention comprises an image generation apparatus having viewpoint definition means for defining a virtual viewpoint placed in virtual three dimensions, virtual panel definition means for defining a virtual object displayed in the virtual three dimensions and defining a virtual panel being placed in the virtual three dimensions, the virtual panel onto which a moving image is projected, based on the virtual viewpoint and the virtual object, and virtual three-dimensional image generation means for placing the virtual panel defined in the virtual panel definition means in the virtual three dimensions, projecting a moving image onto the virtual panel, and generating a virtual three-dimensional image based on computer graphics from the virtual viewpoint defined in the viewpoint definition means, and a moving image output apparatus for outputting the moving image to be projected onto the virtual panel based on the virtual viewpoint defined in the viewpoint definition means. Thus, the virtual three-dimensional image can be generated without storing any moving image in the general-purpose computer, so that even a general-purpose computer having a small storage capacity would be able to generate an image capable of really displaying the object of a human being, an animal, a plant, etc., having curved surface portions and motion. To temporarily store moving images output from the moving image output apparatus in the image generation apparatus, for example, because the moving image output apparatus and the image generation apparatus differ in processing speed, only one moving image may be stored temporarily and even a general-purpose computer having a small storage capacity would be able to generate an image capable of really displaying the object of a human being, an animal, a plant, etc., having curved surface portions and motion. This is an advantage of the invention.

According to the image generation system of the invention, the moving image output apparatus outputs the moving image to be projected onto the virtual panel based on the virtual viewpoint defined in the viewpoint definition means and the virtual object defined in the virtual panel definition means. Thus, the moving image responsive to the definitions of the virtual viewpoint and the virtual object is used to generate the virtual three-dimensional image, so that an image capable of displaying the virtual object changed in view in response to the definitions of the virtual viewpoint and the virtual object can be generated. This is an advantage of the invention.

According to the image generation system of the invention, the viewpoint definition means can change the definition of the virtual viewpoint. Thus, if the position of the virtual viewpoint is changed, appropriate moving images are used one after another to generate the virtual three-dimensional images, so that an image capable of displaying the virtual object changed in view following the viewpoint move responsive to the operator's will as if a virtual object formed of polygons were displayed can be generated. This is an advantage of the invention.

According to the image generation system of the invention, the virtual panel definition means can change the definition of the virtual object. Thus, if the virtual object is changed, appropriate moving images are used one after another to generate the virtual three-dimensional images, so that an image capable of displaying the virtual object changed in view in response to the operator's will as if a virtual object formed of polygons were displayed can be generated. This is an advantage of the invention.

According to the image generation system of the invention, the moving image output apparatus is a moving image photograph apparatus comprising an enclosure being placed around a photograph subject and filled in with one color and a video camera being placed around the photograph subject for outputting a moving image provided by photographing the photograph subject. Thus, a moving image with any other portion than the photograph subject made transparent is output from the moving image output apparatus, so that an image capable of displaying only the photograph subject as a virtual object can be generated. This is an advantage of the invention.

The image generation system of the invention further includes definition range control means in which the type of moving image output from the moving image output apparatus is previously entered, the definition range control means being responsive to the type of moving image for controlling the definition range of the virtual viewpoint defined in the viewpoint definition means or the virtual object defined in the virtual panel definition means. Thus, the definition range of the virtual viewpoint or the virtual object in the virtual three dimensions can be limited, so that if there is a restriction on the moving image projected onto the virtual panel, an inappropriate virtual three-dimensional image can be prevented from being generated. This is an advantage of the invention.

The image generation system according to another aspect of the invention comprises viewpoint definition means for defining a virtual viewpoint placed in virtual three dimensions, object definition means for defining a virtual object displayed in the virtual three dimensions, virtual three-dimensional image generation means for generating a virtual three-dimensional image based on computer graphics from the virtual viewpoint defined in the viewpoint definition means, a moving image output apparatus for outputting a moving image based on the virtual viewpoint defined in the viewpoint definition means, and image combining means for generating a composite image into which the image generated in the virtual three-dimensional image generation means and the moving image output from the moving image output apparatus are combined. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus and the virtual three-dimensional image generation means differ in processing speed, only one moving image may be stored temporarily and even a general-purpose computer having a small storage capacity would be able to generate an image capable of really displaying the object of a human being, an animal, a plant, etc., having curved surface portions and motion. This is an advantage of the invention.

According to the image generation system of the invention, the moving image output apparatus generates the moving image based on the virtual viewpoint defined in the viewpoint definition means and the virtual object defined in the object definition means. Thus, the moving image responsive to the definitions of the virtual viewpoint and the virtual object is used to generate the virtual three-dimensional image, so that an image capable of displaying the virtual object changed in view in response to the definitions of the virtual viewpoint and the virtual object can be generated. This is an advantage of the invention.

According to the image generation system of the invention, the viewpoint definition means can change the definition of the virtual viewpoint. Thus, if the position of the virtual viewpoint is changed, appropriate moving images are used one after another to generate the virtual three-dimensional images, so that an image capable of displaying the virtual object changed in view following the viewpoint move responsive to the operator's will as if a virtual object formed of polygons were displayed can be generated. This is an advantage of the invention.

According to the image generation system of the invention, the object definition means can change the definition of the virtual object. Thus, if the virtual object is changed, appropriate moving images are used one after another to generate the virtual three-dimensional images, so that an image capable of displaying the virtual object changed in view in response to the operator's will as if a virtual object formed of polygons were displayed can be generated. This is an advantage of the invention.

The image display system according to another aspect of the invention comprises an image generation system for generating a virtual three-dimensional image for a right eye and a virtual three-dimensional image for a left eye, and a display for producing display so that the virtual three-dimensional image for the right eye generated by the image generation system is visible with a right eye and the virtual three-dimensional image for the left eye generated by the image generation system is visible with a left eye at the same time. Thus, a three-dimensional appearance can be given to the moving image projected onto the virtual panel, so that a virtual object given a three-dimensional appearance can be displayed. This is an advantage of the invention.

The computer-readable record medium according to another aspect of the invention records an image generation program for executing viewpoint definition step for defining a virtual viewpoint placed in virtual three dimensions, virtual panel definition step for defining a virtual object displayed in the virtual three dimensions and defining a virtual panel being placed in the virtual three dimensions, the virtual panel onto which a moving image is projected, based on the virtual viewpoint and the virtual object, moving image selection step for selecting a moving image to be projected onto the virtual panel from among a plurality of moving images output from a moving image output apparatus for outputting the plurality of moving images based on the virtual viewpoint defined at the viewpoint definition step, and virtual three-dimensional image generation step for placing the virtual panel defined at the virtual panel definition step in the virtual three dimensions, projecting the moving image selected at the moving image selection step onto the virtual panel, and generating an image from the virtual viewpoint defined at the viewpoint definition step. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus differs in processing speed, only selected one of a plurality of moving images may be stored temporarily and even a general-purpose computer having a small storage capacity would be able to generate an image capable of really displaying the object of a human being, an animal, a plant, etc., having curved surface portions and motion. This is an advantage of the invention.

The computer-readable record medium according to another aspect of the invention records an image generation program for generating a virtual three-dimensional image based on computer graphics, the program for executing viewpoint definition step for defining a virtual viewpoint placed in virtual three dimensions, virtual panel definition step for defining a virtual object displayed in the virtual three dimensions and defining a virtual panel being placed in the virtual three dimensions, the virtual panel onto which a moving image is projected, based on the virtual viewpoint and the virtual object, and virtual three-dimensional image generation step for placing the virtual panel defined at the virtual panel definition step in the virtual three dimensions, projecting a moving image output from a moving image output apparatus based on the virtual viewpoint defined at the viewpoint definition step onto the virtual panel, and generating a virtual three-dimensional image based on computer graphics from the virtual viewpoint defined at the viewpoint definition step. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus differs in processing speed, only one moving image may be stored temporarily and even a general-purpose computer having a small storage capacity would be able to generate an image capable of really displaying the object of a human being, an animal, a plant, etc., having curved surface portions and motion. This is an advantage of the invention.

The computer-readable record medium according to another aspect of the invention records an image generation program for generating a virtual three-dimensional image based on computer graphics, the program for executing viewpoint definition step for defining a virtual viewpoint placed in virtual three dimensions, object definition step for defining a virtual object displayed in the virtual three dimensions, virtual three-dimensional image generation step for generating a virtual three-dimensional image based on computer graphics from the virtual viewpoint defined in the viewpoint definition step, and image combining step for generating a composite image into which the image generated at the virtual three-dimensional image generation step and the moving image output from a moving image output apparatus based on the virtual viewpoint defined at the viewpoint definition step are combined. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus differs in processing speed, only one moving image may be stored temporarily and even a general-purpose computer having a small storage capacity would be able to generate an image capable of really displaying the object of a human being, an animal, a plant, etc., having curved surface portions and motion. This is an advantage of the invention.

The image generation method according to another aspect of the invention comprises the viewpoint definition step for defining a virtual viewpoint placed in virtual three dimensions, the virtual panel definition step for defining a virtual object displayed in the virtual three dimensions and defining a virtual panel being placed in the virtual three dimensions, the virtual panel onto which a moving image is projected, based on the virtual viewpoint and the virtual object, the moving image selection step for selecting a moving image to be projected onto the virtual panel from among a plurality of moving images output from a moving image output apparatus for outputting the plurality of moving images based on the virtual viewpoint defined at the viewpoint definition step, and the virtual three-dimensional image generation step for placing the virtual panel defined at the virtual panel definition step in the virtual three dimensions, projecting the moving image selected at the moving image selection step onto the virtual panel, and generating an image from the virtual viewpoint defined at the viewpoint definition step. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus differs in processing speed, only selected one of a plurality of moving images may be stored temporarily and even a general-purpose computer having a small storage capacity would be able to generate an image capable of really displaying the object of a human being, an animal, a plant, etc., having curved surface portions and motion. This is an advantage of the invention.

The image generation method according to another aspect of the invention comprises the viewpoint definition step for defining a virtual viewpoint placed in virtual three dimensions, the virtual panel definition step for defining a virtual object displayed in the virtual three dimensions and defining a virtual panel being placed in the virtual three dimensions, the virtual panel onto which a moving image is projected, based on the virtual viewpoint and the virtual object, and the virtual three-dimensional image generation step for placing the virtual panel defined at the virtual panel definition step in the virtual three dimensions, projecting a moving image output from a moving image output apparatus based on the virtual viewpoint defined at the viewpoint definition step onto the virtual panel, and generating a virtual three-dimensional image based on computer graphics from the virtual viewpoint defined at the viewpoint definition step. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus differs in processing speed, only one moving image may be stored temporarily and even a general-purpose computer having a small storage capacity would be able to generate an image capable of really displaying the object of a human being, an animal, a plant, etc., having curved surface portions and motion. This is an advantage of the invention.

The image generation method according to another aspect of the invention comprises the viewpoint definition step for defining a virtual viewpoint placed in virtual three dimensions, the object definition step for defining a virtual object displayed in the virtual three dimensions, the virtual three-dimensional image generation step for generating a virtual three-dimensional image based on computer graphics from the virtual viewpoint defined in the viewpoint definition step, and the image combining step for generating a composite image into which the image generated at the virtual three-dimensional image generation step and the moving image output from a moving image output apparatus based on the virtual viewpoint defined at the viewpoint definition step are combined. Thus, the virtual three-dimensional image can be generated without storing any moving image, so that even a general-purpose computer having a small storage capacity would be able to generate an image capable of really displaying the object of a human being, an animal, a plant, etc., having curved surface portions and motion. To temporarily store moving images output from the moving image output apparatus, for example, because the moving image output apparatus differs in processing speed, only one moving image may be stored temporarily and even a general-purpose computer having a small storage capacity would be able to generate an image capable of really displaying the object of a human being, an animal, a plant, etc., having curved surface portions and motion. This is an advantage of the invention.

What is claimed is:

1. An image generation system for generating a virtual three-dimensional image based on computer graphics, the image generation system comprising:
    an image generation apparatus comprising:
        viewpoint definition means for defining a virtual viewpoint placed in virtual three dimensions;
        virtual panel definition means for defining a virtual object displayed in the virtual three dimensions and defining
        a virtual panel being placed in the virtual three dimensions, wherein the virtual panel onto which a moving image is projected is based on the virtual viewpoint and the virtual object;
        moving image selection means for selecting a moving image to be projected onto the virtual panel from among a plurality of moving images based on the virtual viewpoint defined in the viewpoint definition means; and
        virtual three-dimensional image generation means for placing the virtual panel defined in the virtual panel definition means in the virtual three dimensions, projecting the moving image selected by the moving image selection means onto the virtual panel, and generating an image from the virtual viewpoint defined in the viewpoint definition means, and
    a moving image output apparatus for outputting the plurality of moving images to the image generation apparatus.

2. The image generation system as claimed in claim 1 wherein the moving image selection means selects the moving image to be projected onto the virtual panel from among a plurality of moving images based on the virtual viewpoint defined in the viewpoint definition means and the virtual object defined in the virtual panel definition means.

3. An image generation system for generating a virtual three-dimensional image based on computer graphics, the image generation system comprising:
    an image generation apparatus having:
        viewpoint definition means for defining a virtual viewpoint placed in virtual three dimensions;
        virtual panel definition means for defining a virtual object displayed in the virtual three dimensions and defining a virtual panel being placed in the virtual three dimensions, wherein the virtual panel onto which a moving image is projected is based on the virtual viewpoint and the virtual object; and
        virtual three-dimensional image generation means for placing the virtual panel defined in the virtual panel definition means in the virtual three dimensions, projecting a moving image onto the virtual panel, and generating a virtual three-dimensional image based on computer graphics from the virtual viewpoint defined in the viewpoint definition means, and
    a moving image output apparatus for outputting the moving image to be projected onto the virtual panel based on the virtual viewpoint defined in the viewpoint definition means.

4. The image generation system as claimed in claim 3 wherein the moving image output apparatus outputs the moving image to be projected onto the virtual panel based on the virtual viewpoint defined in the viewpoint definition means and the virtual object defined in the virtual panel definition means.

5. The image generation system as claimed in claim 1 wherein the viewpoint definition means can change the definition of the virtual viewpoint.

6. The image generation system as claimed in claim 1 wherein the virtual panel definition means can change the definition of the virtual object.

7. The image generation system as claimed in claim 1 wherein the moving image output apparatus is a moving image photograph apparatus comprising an enclosure being placed around a photograph subject and filled in with one color and a video camera being placed around the photograph subject for outputting a moving image provided by photographing the photograph subject.

8. The image generation system as claimed in claim 1 further including definition range control means in which the type of moving image output from the moving image output apparatus is previously entered, the definition range control means being responsive to the type of moving image for controlling the definition range of the virtual viewpoint defined in the viewpoint definition means or the virtual object defined in the virtual panel definition means.

9. An image generation system for generating a virtual three-dimensional image based on computer graphics, the image generation system comprising:

viewpoint definition means for defining a virtual viewpoint placed in virtual three dimensions;

object definition means for defining virtual object displayed in the virtual three dimensions;

virtual three-dimensional image generation means for generating a virtual three-dimensional image based on computer graphics from the virtual viewpoint defined in the viewpoint definition means; and image combining means for receiving a moving image generated externally, said moving image being based on the virtual viewpoint defined in the viewpoint definition means and the virtual object defined by said object definition means, said image combining means generating a composite image by combining the image generated by the virtual three-dimensional image generation means and the received moving image.

10. The image generation system as claimed in claim 9 wherein a moving image output apparatus generates the moving image based on the virtual viewpoint defined in the viewpoint definition means and the virtual object defined in the object definition means.

11. The image generation system as claimed in claim 9 wherein the viewpoint definition means can change the definition of the virtual viewpoint.

12. The image generation system as claimed in claim 9 wherein the object definition means can change the definition of the virtual object.

* * * * *